United States Patent
Gligor et al.

(10) Patent No.: US 7,054,445 B2
(45) Date of Patent: May 30, 2006

(54) AUTHENTICATION METHOD AND SCHEMES FOR DATA INTEGRITY PROTECTION

(75) Inventors: Virgil Dorin Gligor, Chevy Chase, MD (US); Pompiliu Donescu, Gaithersburg, MD (US)

(73) Assignee: VDG, Inc., Chevy Chase, MD (US)

( * ) Notice: Subject to any disclaimer, the term of this patent is extended or adjusted under 35 U.S.C. 154(b) by 936 days.

(21) Appl. No.: 09/818,608

(22) Filed: Mar. 28, 2001

(65) Prior Publication Data

US 2001/0046292 A1 Nov. 29, 2001

Related U.S. Application Data

(60) Provisional application No. 60/193,447, filed on Mar. 31, 2000.

(51) Int. Cl.
*H04L 9/30* (2006.01)

(52) U.S. Cl. ............................. 380/37; 380/28; 380/44; 713/170

(58) Field of Classification Search ............ 380/28–29, 380/37, 44, 46; 713/170
See application file for complete search history.

(56) References Cited

U.S. PATENT DOCUMENTS

| | | | | |
|---|---|---|---|---|
| 4,423,287 A * | 12/1983 | Zeidler | ........................ | 705/71 |
| 5,757,913 A | 5/1998 | Bellare et al. | ................ | 380/23 |
| 6,434,699 B1 * | 8/2002 | Jones et al. | .................. | 713/168 |
| 6,591,364 B1 * | 7/2003 | Patel | ........................ | 713/170 |
| 6,769,063 B1 * | 7/2004 | Kanda et al. | ............... | 713/193 |

OTHER PUBLICATIONS

Bernstein, Daniel, "How to stretch random funcitons: the security of protected counter sums", 1999, Journal of Cryptology, vol. 12, No. 3, pp. 185-192.*

Jueneman et al, "Message authenticaiton with manipulation detection codes", Proc. of the IEEE Symp. on Security and Privacy, Oakland, CA pp. 33-54, 1983, IEEE Computer Society.*

Virgil D. Gligor et al., "Object Migration and Authentication.", IEEE Transactions on software Engineering, vol. SE-5, No. 6, Nov. 1979, pp. 607-611.

(Continued)

*Primary Examiner*—Emmanuel L. Moise
*Assistant Examiner*—Minh Dieu Nguyen
(74) *Attorney, Agent, or Firm*—Foley & Lardner LLP

(57) ABSTRACT

An authentication method and schemes using a block cipher to protect data integrity (authenticity) during communication over insecure channels and during data storage on insecure media. The authentication method and schemes of this invention allow, in a further aspect, message and data signing and verification in parallel or pipelined manners, in addition to sequential operation, without requiring twice as many block enciphering operations as the number of input plaintext blocks. The present invention allows, in a yet further aspect, software and hardware implementations used in high-performance systems and networks where multiple processing units are available for block enciphering operations. In a yet further aspect, the authentication method and schemes of this invention allow incremental updates and out-of-order processing of authentication tags. In a yet further aspect, the authentication method and schemes of this invention are suitable for real-time applications where message length remains unknown until the entire message is received, and commencing message authentication cannot be deferred until the end of the message.

66 Claims, 16 Drawing Sheets

OTHER PUBLICATIONS

Alfred J. Menezes et al., "Handbook of Applied Cryptography", pp. 321-367, (1965).

J. Black et al., "UMAC: Fast and Secure Message Authentication.", Advances in Cryptology-CRYPTO '99, pp. 216-233.

Mihir Bellare et al., "Keying Hash Functions For Message Authentication", Springer-Verlag Berlin Heidelberg, pp. 216-233, (1996).

Mihir Bellare et al., "The Security of Cipher Block Chaining.", Advances in Cryptology-CRYPTO '94, pp. 341-358.

Federal Information Processing Standards Publication 46-1, Data Encryption Standard (DES), pp. 1-16, (1988).

Federal Information Processing Standards Publication 46-2, Data Encryption Standard (DES), pp. 1-18, (1993).

Erez Petrank et al., "CBC MAC For Real-Time Data Sources", Federal Information Processing Standards Publication 46-2, Data Encryption, pp. 1-23, (1993).

American National Standard ANSI X9.9 (1986) pp. 6-8.

Mihir Bellare et al., "XOR MACs: New Methods for Message Authentication Using Finite Pseudorandom Functions", pp. 1-20, (1995) Preliminary version appearing in Advances in Cryptology-CRYPTO '95, Lecture Notes in Computer Science vol. 963.

Mihir Bellare et al., "Incremental Cryptography and Application to Virus Protection.", pp. 1-15, (1995), Abstract appearing in Proceedings of the 27th ACM Symposium on the Theory of Computing, May (1995).

Moni Naor et al., "From Unpredictability to Indistinguishability: A Simple Construction of Pseudo-Random Functions from MACs.", Advances In Cryptology-CRYPTO '98, Springer-Verlag Berlin Heidelberg, pp. 265-282, (1998).

Mihir Bellare et al., "A Concrete Security Treatment of Symmetric Encryption", Proceedings of the 38th Symposium on Foundations of Computer Science, IEEE,(1997) pp. 394-403.

Donald E. Knuth., "The Art of Computer Programming-vol. 2: Seminumerical Algorighms.", Addison-Wesley, (1981) (Second Edition), Chapter 3.

Gligor et al., "Object Migration And Authentication", *IEEE Transactions On Software Engineering*, vol. SE-5(6):607-611, (1979).

Menezes et al., "Handbook of Applied Cryptography", pp. 321-367, (1965).

Gilbert et al., "A Chosen Plaintext Attack Of The 16-Round Khufu Cryptosystem", pp. 340-358, (1988).

Desmedt, "Advances In cryptology—CRYPTO '94", 14th Annual International Cryptology Conference, pp. 1-19, (1994).

Bellare et al., "Keying Hash Functions For Message Authentication", Springer-Verlang Berlin Heidelberg, pp. 216-233, (1996).

Wiener, "Advances In Cryptoloty—CRYPTO '99", 19th Annual International Cryptology Conference, pp. 368-383, (1999).

Federal Information Processing Standards Publication 46-2, Data Encryptioin Standard (DES), pp. 1-5, (1993).

Petrank et al., "CBC MAC For Real-Time Data Sources", Federal Information Processing Standards Publication 46-2, Data Encryptioin, pp. 1-18 and 1-23, (1993).

Bellare et al., "XOR MACs: new Methods for Message Authentication Using Finite Pseudorandom Functions", pp. 1-20 and 1-15, (1995).

Krawczyk, "Advances In Cryptology CRYPTO '98", Springer-Verlag Berlin Heidelberg, pp. 265-282, (1998).

Bellare et al., "A Concrete Security Treatment of Symmetric Encryption", pp. 394-404, (1996).

\* cited by examiner

AUTHENTICATION METHOD AND SCHEMES FOR DATA INTEGRITY PROTECTION

CROSS-REFERENCE TO RELATED APPLICATION(S)

This application claims the benefit of priority under 35 U.S.C Section 119(e) of provisional application Ser. No. 60/193,447 entitled "XCBC Encryption Modes and XECB Authentication Modes" filed on Mar. 31, 2000, the disclosure of which is incorporated herein in its entirety.

FIELD OF THE INVENTION

The present invention relates to the technical field of data communication over insecure channels and data storage on insecure media. Specifically, the invention relates to authentication methods, program products and systems based on block ciphers that protect data integrity efficiently in a parallel, pipelined or sequential manner, and can process, generate and verify authentication tags incrementally and in an out-of-order fashion.

BACKGROUND OF THE INVENTION

Message authentication methods provide the ability of a message recipient communicating with a message sender via an insecure channel to determine whether the message received was, in fact, generated by the message sender. These methods are desirable because an insecure channel allows a party not intended to communicate via the insecure channel (i.e., an adversary) to alter the other parties' messages (sections deleted, rearranged, added to, etc.) and insert messages of their own into the insecure channel. Message authentication methods guarantee the integrity (authenticity) of message data such that an adversary cannot alter a message after it is generated, transmitted on, or stored in, the insecure channel in a way that remains undetected by a message recipient. Authentication methods are also desirable whenever a party stores a set of data on an insecure storage device that can be accessed by other parties which are not intended to alter those data (viz., V. D. Gligor and B. G. Lindsay: "Object Migration and Authentication," IEEE Transactions on Software Engineering, SE-5 Vol. 6, November 1979).

Message authentication methods were surveyed by A. J. Menezes, P. C. van Oorschot, and S. A. Vanstone in their book "Handbook of Applied Cryptography", CRC Press, Boca Raton, 1997, incorporated by reference herein. A well-known method for performing message authentication requires that an authentication tag, also known as the Message Authentication Code (MAC), be computed for a message using a block cipher, with a secret key shared by the sender and receiver. The length of the authentication tag, or MAC, is fixed and usually much smaller than that of the message for which it is computed. Upon receipt of a message and its authentication tag, a receiver computes the authentication tag of the received message by applying the block cipher in the same manner as that used by the sender, and compares the computed tag with the received tag. If the two tags are equal, the message is accepted as authentic; otherwise, the message is rejected. The specific procedure for computing and verifying an authentication tag (or MAC) is called the authentication scheme or mode.

It is well-known in the art that aforementioned block ciphers, which have long been established among the cryptographic primitives of choice for implementing general message and data encryption, can be used to implement message authentication schemes. A block cipher uses a key to transform data (plaintext) blocks of fixed length into ciphertext blocks of the same length. Although message authentication schemes exist that use other cryptographic primitives (e.g., hash functions) and do not rely exclusively on block ciphers (viz., J. Black, S. Halevi, H. Krawczyk, T. Krovetz, and P. Rogaway, "UMAC: Fast Message Authentication via Optimized Universal Hash Functions," Advances in Cryptology—CRYPTO '99, Springer-Verlag, LNCS 1666, 216–233, 1999; and M. Bellare, R. Canetti, and H. Krawczyk, "Keying Hash Functions for Message Authentication," Advances in Cryptology—CRYPTO '96, Springer-Verlag, LNCS 1109, pp. 1–15, 1996, for some recent examples), authentication schemes that use only block ciphers are both necessary and desirable. They are necessary whenever the block cipher is the only cryptographic primitive available, as it is often the case since (1) block ciphers alone are sufficient, and routinely used, for most cryptographic operations including message encryption, and (2) supporting additional, separate cryptographic primitives (e.g., hash functions) to be used exclusively for message authentication would increase both system complexity and cost. They are desirable whenever the use of block ciphers leads to improved performance of the message authentication scheme, as it is often the case since hardware and firmware support for block-cipher implementation is significantly more widespread and less costly than that for cryptographic primitives specialized for MAC computation and verification (e.g., hardware and firmware support for hash functions).

The best-known authentication scheme based exclusively on block ciphers is the Cipher-Block Chaining Message Authentication Code (CBC-MAC). The CBC-MAC takes as input data a plaintext string $x=x_1 \ldots x_n$ and a secret key K shared by the sender of message x and the intended receiver. Key K is usually chosen uniformly at random. The size of each block $x_i$ is l bits and that of key K is k bits. The authentication tag of plaintext x is provided by $z_n$, where $z_i=F_K(x_i \oplus z_{i-1})$, where $i=1, \ldots, n$, $z_0=O$, $\oplus$ is the bit-wise exclusive-or operation, and $F_K$ is the block cipher F using key K (viz., M. Bellare, J. Killian, P. Rogaway: "The security of cipher block chaining," Advances in Cryptology—CRYPTO '94, LNCS 839, pp. 341–358, 1994). After receiving message x and authentication tag $z_n'$, the receiver computes authentication tag $z_n$ of message x and then compares this tag with $z_n'$. Message x is accepted as authentic by the receiver only if the two tags are equal.

A well-known block cipher used to implement the CBC-MAC, as well as other MACs, is provided by the U.S. Data Encryption Standard (DES), which uses a key size k of 56 bits and has both the input and output block sizes l of 64 bits (viz., NBS FIPS Pub 46, titled "Data Encryption Standard," National Bureau of Standards, U.S. Department of Commerce, January 1977). It is well-known in the art that the CBC-MAC can use other block cipher algorithms, not just that of DES. In particular, the CBC-MAC, as well as other MACs, can be computed with block ciphers representing pseudo-random functions, not just permutations as in the case of DES, thereby allowing more blocks to be processed before changing the shared secret key (viz., M. Bellare, J. Killian, P. Rogaway: "The security of cipher block chaining," Advances in Cryptology—CRYPTO '94, LNCS 839, pp. 341–358, 1994). Variants of the CBC-MAC have also been proposed for various applications, including the authentication of real-time data sources where (1) message length remains unknown until the entire message is received, and (2) commencing message authentication cannot be deferred until the end of the message (viz., E. Petrank and C. Rackoff: "CBC MAC for Real-Time Data Sources," manuscript available at http://www.cs.technion.ac.il/erez/publications.html, 1999). Some variants of CBC-MAC have also been adopted as national and international standards (e.g., ANSI X9.9: "Financial Institution Authentication," 18 pp., 1986).

It is well-known in the art that the main drawback of the CBC-MAC stems from the sequential manner of the authentication tag computation (viz., M. Bellare, R. Guerin, and P. Rogaway, "XOR-MACs: New Methods for Message Authentication Using Finite Pseudo-Random Functions," Advances in Cryptology—CRYPTO '95, Springer-Verlag, LNCS 963, pp. 15–28; and M. Bellare, R. Guerin, and P. Rogaway, "Method and Apparatus for Data Authentication in a Communication environment," U.S. Pat. No. 5,757,913, dated 26 May 1998). That is, the restriction of computing the authentication tag sequentially imposed by the CBC-MAC definition severely limits the speed with which the tag can be computed in computer systems and networks where multiple processing units are available for the concurrent (i.e., parallel or pipelined) block-enciphering operations needed by authentication-tag computation. Despite the availability of multiple processing units that can perform these operations concurrently (i.e., in a parallel or in a pipelined manner), the authentication tag produced by the CBC-MAC must be implemented sequentially, as if only one such unit were available. This represents a significant performance disadvantage of the CBC-MAC and of all other authentication schemes based on it.

Another disadvantage of the CBC-MAC, also well-understood in the art, is that the CBC-MAC does not allow incremental computation of a new authentication tag from an old one; e.g., if a small section of a large message or stored data, for instance one l-bit block is updated, the entire computation of the authentication tag must be performed from scratch, as would be necessary for any new message, thereby failing to take advantage of the fact that only a small message area is modified and save the block enciphering operations for unmodified blocks (viz., M. Bellare, S. Goldwasser, and O. Goldreich, "Incremental Cryptography and Applications to Virus Protection," Proceedings of the 27$^{th}$ Annual Symposium on the Theory of Computing (STOC '95) ACM Press, pp. 45–56, 1995). As a result, a substantial performance loss in incurred as a consequence of any message or stored data update. A further disadvantage of the CBC-MAC, also well-known in the art, is that the CBC-MAC does not allow out-of-order processing of message blocks for the computation and verification of the authentication tag; e.g., if a block of a message arrives at the authentication tag processing unit before the blocks preceding it in the message, the processing unit must wait until all preceding blocks arrive and are processed before processing the block that arrived first. As a consequence, authentication tag processing is delayed, thereby causing slow-downs of message transmission and reception.

Another message authentication scheme well-known in the art, which relies exclusively on a block cipher, is the XOR-MAC (viz., M. Bellare, R. Guerin, and P. Rogaway, "XOR-MACs: New Methods for Message Authentication Using Finite Pseudo-Random Functions," Advances in Cryptology—CRYPTO '95, Springer-Verlag, LNCS 963, pp. 15–28; and M. Bellare, R. Guerin, and P. Rogaway, "Method and Apparatus for Data Authentication in a Communication environment," U.S. Pat. No. 5,757,913, dated 26 May 1998.) The message to be sent is partitioned into data blocks consecutively identified by their position in the message; i.e., by identifier 1 for the first data block, identifier 2 for the second, and so on. Each data block is encoded together with its identifier to form an l-bit word, where l is the length of the block cipher input, and is submitted for enciphering. A separate ciphertext block is created that represents the enciphering of a message header, and this ciphertext block and all the other ciphertext blocks obtained from the enciphering of the message words are combined by an bitwise exclusive-or operation to create an authentication tag.

Although the XOR-MAC allows parallel, pipelined, incremental, and out-of-order processing of the authentication tag, it has the fundamental disadvantage that it requires twice as many uses of the block enciphering function as those needed by the CBC-MAC for the same length of the input plaintext string. This implies that (1) in sequential implementation, the XOR-MAC is twice as slow as the CBC-MAC, and even slower than other authentication schemes that do not rely exclusively on block ciphers, such as UMAC (viz., J. Black, S. Halevi, H. Krawczyk, T. Krovetz, and P. Rogaway, "UMAC: Fast Message Authentication via Optimized Universal Hash Functions," Advances in Cryptology—CRYPTO '99, Springer-Verlag, LNCS 1666, 216–233, 1999) and HMAC (viz., M. Bellare, R. Canetti, and H. Krawczyk, "Keying Hash Functions for Message Authentication," Advances in Cryptology—CRYPTO '96, Springer-Verlag, LNCS 1109, pp. 1–15, 1996), and (2) in concurrent (i.e., parallel or pipelined) implementation the XOR-MAC is slower than other authentication schemes, such as the UMAC, that can also be implemented in a concurrent manner. As a consequence, use of the XOR-MAC would slow down message transmissions and data storage rates substantially, thereby causing inefficient transmission and storage of information.

SUMMARY OF THE INVENTION

Briefly, the present invention comprises, in one embodiment, an authentication method that provides a data signing function that determines an authentication tag for use in conjunction with transfer of data using a communication channel or with data storage on storage media, comprising the steps of: partitioning the data into a plurality of data blocks; for each of the data blocks, performing a randomization function over the data block to create an input block of the same size as that of the data block, the input block not including a block identifier; applying a pseudo-random function to each the input block to create a plurality of enciphered blocks; and combining the plurality of enciphered blocks to create an authentication tag.

In a further aspect of the present invention, the pseudo-random function is a standard block cipher.

In a further embodiment of the present invention, an authentication method is provided that includes a data signing function that determines an authentication tag, comprising the steps of: receiving an input plaintext string comprising the data to be signed and padding it as necessary such that its length is a multiple of l bits; partitioning the padded input plaintext string into a plurality of equal-size plaintext blocks of l bits in length; creating a random vector of l bits in length; performing a randomization function over the plurality of plaintext blocks and the random vector block to create a plurality of input blocks each of l bits in length; applying a block cipher using a secret key over each of the input blocks to create a plurality of enciphered blocks each of L bits in length; and performing a combination operation over the plurality of enciphered blocks to create an authentication tag.

In a further aspect of the present invention, the performing a randomization function step comprises combining each of the plaintext blocks and the random vector block with a different corresponding element of a sequence of unpredictable elements to create a plurality of input blocks.

In a further aspect, the present invention comprises the step of generating the random vector block from a random number generated on a per-message basis.

In another aspect, the present invention further comprises the step of appending the created random vector block after a last block of the set of equal-sized blocks comprising the padded plaintext string.

In a further aspect of the present invention, the input blocks from the randomization step comprise n+1 blocks each of l-bit length, where n is the total number of blocks in the set of equal-sized blocks of the padded input plaintext string.

In a further aspect, the present invention comprises the step of generating each of a plurality of the unpredictable elements of the sequence of unpredictable elements by combining a different element index i of each of the unpredictable elements and a random initial vector.

In a further aspect, the present invention comprises the step of generating the random initial vector from a random number generated on a per-message basis.

In a further aspect, the present invention comprises the steps of: the sequence of the unpredictable elements is generated by combining a different element index i of each of the unpredictable elements and a random initial vector; and wherein the random initial vector is generated from the random number.

In a further aspect, the present invention comprises the steps of: enciphering a random number using the block cipher using the secret key to generate a random initial vector; and using this random initial vector to generate the elements of the sequence of unpredictable elements.

In a further aspect of the present invention, the random vector is generated by enciphering a random number of l bits in length, the enciphering using the block cipher using a secret second key.

In a further aspect of the present invention, the random vector is generated by enciphering a variant of the random number of l bits in length, the enciphering using the block cipher using the secret key.

In a further aspect of the present invention, the variant of the random number is obtained by adding a non-zero constant to the random number.

In a further aspect, the present invention comprises the steps of: wherein the random number is provided by a random number generator; and outputting the random number as an output block of the authentication scheme.

In a further aspect, the present invention comprises: generating the random initial vector by enciphering a count of a counter initialized to a constant, the enciphering being performed with the block cipher using the secret key; generating the random vector block from the count of a counter; and incrementing the counter by one on every message signing.

In a further aspect of the present invention, the random vector block is generated by enciphering the count of a counter using a second secret key.

In a further aspect of the present invention, the random vector is generated by enciphering a variant of the count of a counter, the enciphering using the block cipher using the secret key.

In a further aspect of the present invention, the variant of the of the count of a counter is obtained by adding a non-zero constant to the count of counter.

In a further aspect of the present invention, the counter is initialized to a constant whose value is the l-bit representation of negative one.

In a further aspect, the present invention comprises: outputting the counter value as an output block of the authentication scheme.

In a further aspect, the present invention comprises the steps of: wherein the random vector is generated from a shared, per-key, random initialization vector and the count of a counter; incrementing the counter by one on every message signing, wherein the counter is initialized to a constant whose value is the l-bit representation of negative one; and outputting the counter value as an output block of the authentication scheme.

In a further aspect of the present invention, the combination operation comprises a bit-wise exclusive-or operation.

In a further aspect of the present invention, the combination operation comprises an addition modulo $2^L-1$.

In a further aspect of the present invention, the combination operation comprises a subtraction modulo $2^L-1$.

In a further aspect of the present invention, the combining step to create a plurality of input blocks comprises an addition modulo $2^l$ operation.

In a further aspect of the present invention, the combining step to create a plurality of input blocks comprises a bit-wise exclusive-or operation.

In a further aspect of the present invention, the combining step to create a plurality of input blocks comprises a subtraction modulo $2^l$ operation.

In a further aspect, the present invention comprises: generating a random initial vector from a random number of l-bit length; and generating each element in the sequence of unpredictable elements by modular $2^l$ multiplication of a different unique element identifier (i) for each element in the sequence of unpredictable elements and the random initial vector.

In a further aspect, the present invention comprises: generating a random initial vector from a random number of l-bit length; and generating each element in the sequence of unpredictable elements from the previous element by modular $2^l$ addition of the random initial vector to the previous element, with a first element of the sequence being the random initial vector itself.

In a further aspect of the present invention, the performing a randomization function over the plurality of plaintext blocks and the random vector block is done concurrently for each plaintext block and the random vector block.

In a further aspect of the present invention, the plurality of input blocks resulting from performing a randomization function over the plurality of plaintext blocks and the random vector block are concurrently presented to a plurality of block ciphers using a secret key.

In a further embodiment of the present invention, an authentication method is provided that includes a data signing function that determines an authentication tag, comprising the steps of: receiving an input plaintext string comprising the data to be signed and padding it as necessary such that its length is a multiple of l bits; partitioning the padded input plaintext string into a plurality of n equal-size plaintext blocks of l bits in length; performing a randomization function over the plurality of n plaintext blocks to create a plurality of input blocks each of l bits in length; applying a block cipher using a secret key over each of the the input blocks to create a plurality of enciphered blocks each of L bits in length; and performing a combination operation over the plurality of enciphered blocks to create an authentication tag.

In a further aspect of the present invention, the step of performing a randomization function over said plurality of n plaintext blocks comprises combining each of said plurality of plaintext blocks with a different corresponding element of a plurality of n unpredictable elements to create a plurality of input blocks.

In a further aspect of the present invention, each of the said plurality of n unpredictable elements is obtained by applying an operation to a different per-message unpredictable element and each of a plurality of internal unpredictable elements.

In a further aspect, the present invention comprises the steps of: the per-message unpredictable element is obtained from an l-bit counter and a secret, first random initial vector shared between sender and receiver; and each of the plurality of internal unpredictable elements is obtained from an l-bit element index and a secret, second random initial vector shared between sender and receiver.

In a further aspect of the present invention, the operation applied to a different per-message unpredictable element and each of a plurality of internal unpredictable elements comprises an addition modulo $2^l$ operation.

In a further aspect of the present invention, the operation applied to a different per-message unpredictable element and each of a plurality of internal unpredictable elements comprises a subtraction modulo $2^l$ operation.

In a further aspect of the present invention, the operation applied to a different per-message unpredictable element and each of a plurality of internal unpredictable elements comprises a bit-wise exclusive- or operation.

In a further aspect, the present invention comprises the steps of: the per-message unpredictable element is obtained by multiplication modulo $2^l$ of said secret, first random initial vector with a different value of the counter; and each of the plurality of internal unpredictable elements is obtained by multiplication modulo $2^l$ of said secret, second random initial vector with a different value of the index.

In a further aspect, the present invention comprises the steps of: the per-message unpredictable element is obtained from the previous per-message unpredictable element by modular $2^l$ addition of said first random initial vector to the previous per-message unpredictable element, with a first per-message unpredictable element being said first random initial vector itself; and each of the plurality of internal unpredictable elements is obtained from the previous internal unpredictable element by modular $2^l$ addition of said second random initial vector to the previous internal unpredictable element, with a first internal unpredictable element being said second random initial vector itself.

In a further aspect of the present invention, the combining step to create a plurality of input blocks comprises an addition modulo $2^l$ operation.

In a further aspect of the present invention, the combining step to create a plurality of input blocks comprises a subtraction modulo $2^l$ operation.

In a further aspect of the present invention, the said combining step to create a plurality of input blocks comprises a bit-wise exclusive-or operation.

In a further aspect, the present invention comprises the steps of: generating said counter anew for every new key; initializing generated counter to a constant value; for each message being signed using key, incrementing said counter by one; and outputting said counter as an output block of the authentication scheme.

In a further aspect of the present invention, the said combination operation comprises a bit-wise exclusive-or operation.

In a further aspect of the present invention, the combination operation comprises an addition modulo $2^L-1$.

In a further aspect of the present invention, the said combination operation comprises a subtraction modulo $2^L-1$.

In yet a further embodiment of the present invention, a verification method is provided for an authentication method, which provides data integrity, comprising the steps of: presenting a string including a plaintext string and an input authentication tag for verification; partitioning the plaintext string into a plurality of n plaintext blocks comprising l bits each; performing the same randomization function as that used at a signing method for determining an authentication tag over the plurality of plaintext blocks to create a plurality of input blocks each of l bits in length; applying a block cipher using a secret key over each of the the input blocks to create a plurality of enciphered blocks each of L bits in length; performing the same combination operation as that used at a signing method for determining an authentication tag over the plurality of enciphered blocks to compute an authentication tag; verifying integrity of the plaintext blocks by comparing the input authentication tag and the computed authentication tag.

In a further aspect, the present invention comprises the steps of: creating a secret random vector block of l bits in length; performing the same randomization function as that used at a signing method for determining an authentication tag over the plurality of plaintext blocks and the secret random vector block to create a plurality of input blocks each of l bits in length; wherein performing the randomization function further comprises: deriving a random initial vector from the string presented for verification; generating a sequence of unpredictable elements each of l-bit length from the random initial vector in the same manner as used at signing method; and selecting n plaintext blocks from the string in the same order as that used at the signing method, and combining the selected plaintext blocks and the random vector with a different corresponding element of the sequence of unpredictable elements to obtain a plurality of input blocks, in the same manner as that used at the signing method.

In a another aspect of the present invention, the performing the randomization function further comprises: using a secret, random initial vector shared between sender and receiver; generating a sequence of unpredictable elements each of l-bit length from the secret, random initial vector in the same manner as used at signing method; and selecting n plaintext blocks from the string in the same order as that used at the signing method, and combining the selected plaintext blocks with a different corresponding element of the sequence of unpredictable elements to obtain a plurality of input blocks, in the same manner as that used at the signing method.

In a further aspect, the present invention comprises: selecting one block of the from the string presented for authentication, which block contains a random number; and enciphering the selected block to obtain the random initial vector using the block cipher using a first secret key.

In a further aspect, the present invention comprises: for the signing method generating a random initial vector by enciphering a count of a counter initialized to a constant, the enciphering being performed with the block cipher using a secret key; and incrementing the counter by one on every message signing; and further comprising for authentication of the partitioned plaintext string the steps of: selecting a counter block representing the count of the counter from the string presented at verification; and enciphering the selected counter block to obtain a random initial vector.

In a further aspect of the present invention, the enciphering step comprises performing the enciphering using the block cipher using the secret key.

In a further embodiment of the present invention, an authentication method is provided that includes a data signing function that updates an authentication tag incrementally, comprising the steps of: receiving an input plaintext string comprising the data to be signed and padding it as necessary such that its length is a multiple of l bits; partitioning the padded input plaintext string into a plurality of equal-size plaintext blocks of l bits in length; performing a randomization function over said plurality of plaintext blocks to create a plurality of input blocks each of l bits in length; applying a block cipher using a secret key over each of the said input blocks to create a plurality of enciphered blocks each of L bits in length; performing a combination operation over said plurality of enciphered blocks to create an authentication tag, said combination operation having an inverse; and further comprising the steps of: receiving an input plaintext string including a plaintext string and an input authentication tag; partitioning said plaintext string into a plurality of n plaintext blocks comprising l bits each; receiving a new l-bit input plaintext block to replace an l-bit plaintext block of said input plaintext string at index i; performing the same randomization function as that used at a signing method, using index i, on said new input plaintext block to create a first input block and performing the same randomization function as that used at a signing method, using index i, on said plaintext block at index i to create a second input block, each of the said created input blocks having l bits in length; applying a block cipher using a secret key to the first input block and the second input block to create a first enciphered block and a second enciphered block, each of L bits in length; performing the inverse of said combination operation used at a signing method for determining an authentication tag to the input authentication tag and said second enciphered block; performing the said combination operation used at a signing method for determining an authentication tag to first enciphered block and the result of performing the inverse of said combination operation; and outputting the result of performing said combination operation to the first enciphered block and the result of performing the inverse of said combination operation as the authentication tag.

In a further aspect, the present invention comprises: receiving a plurality of new l-bit input plaintext blocks to replace a plurality of l-bit plaintext blocks of said input plaintext string at index i; and providing a data signing function that determines an authentication tag incrementally for each of the said plurality of new l-bit input plaintext blocks.

In a further embodiment of the present invention, an authentication method is provided that includes a data signing function that determines an authentication tag, comprising the steps of: receiving an input plaintext string comprising the data to be signed and padding it as necessary such that its length is a multiple of l bits; partitioning the padded input plaintext string into a plurality of equal-size plaintext blocks of l bits in length; performing a randomization function over each of said plurality of plaintext blocks using a different index for each plaintext block to create a plurality of input blocks each of l bits in length; applying a block cipher using a secret key over each of the said input blocks to create a plurality of enciphered blocks each of L bits in length; performing a combination operation over said plurality of enciphered blocks to create an authentication tag; and further providing an out-of-order verification function for the authentication method comprising the steps of: receiving an input authentication tag for verification and a plurality of n plaintext blocks comprising l bits each, each plaintext block being accompanied by a different index; performing a randomization function over each of said plurality of plaintext blocks using said index for each plaintext block to create a plurality of input blocks each of l bits in length; applying a block cipher using a secret key over each of the said input blocks to create a plurality of enciphered blocks each of L bits in length; performing the same combination operation as that used at a signing method for determining an authentication tag over said plurality of enciphered blocks to compute an authentication tag; verifying integrity of the plaintext blocks by comparing the input authentication tag and the computed authentication tag.

In yet a further embodiment of the present invention, an authentication system is provided for a data signing function that determines an authentication tag for use in conjunction with transfer of data using a communication channel or with data storage on storage media, comprising: a partitioner for partitioning the data into a plurality of data blocks; a randomization component which, for each of the data blocks, performs a randomization function over the data block to create an input block of the same size as that of the data block, the input block not including a block identifier; a pseudo-random encipher component for applying a pseudo-random function to each the input block to create a plurality of enciphered blocks; and a combining component for combining the plurality of enciphered blocks to create an authentication tag.

In yet a further embodiment of the present invention, an authentication system for providing a data signing function is disclosed that determines an authentication tag, comprising: a partitioner for partitioning an input plaintext string into a plurality of equal-size plaintext blocks of l bits in length; a first component for creating a random vector of l bits in length; a second component for performing a randomization function over the plurality of plaintext blocks and the random vector block to create a plurality of input blocks each of l bits in length; a block cipher component for applying a block cipher using a secret key over each of the input blocks to create a plurality of enciphered blocks each of L bits in length; and a combining component for performing a combination operation over the plurality of enciphered blocks to create an authentication tag.

In yet a further embodiment of the present invention, an authentication system for providing a data signing function is disclosed that determines an authentication tag, comprising: a partitioning component for partitioning a padded input plaintext string into a plurality of n equal-size plaintext blocks of l bits in length; a first component for performing a randomization function over the plurality of n plaintext blocks to create a plurality of input blocks each of l bits in length; a second component for applying a block cipher using a secret key over each of the the input blocks to create a plurality of enciphered blocks each of L bits in length; and a combining component for performing a combination operation over the plurality of enciphered blocks to create an authentication tag.

In yet a further embodiment of the present invention, a verification system for an authentication method which provides data integrity is disclosed comprising: a receiver for receiving a string including a plaintext string and an input authentication tag for verification; a partitioner component for partitioning the plaintext string into a plurality of n plaintext blocks comprising l bits each; a first component for performing the same randomization function as that used at a signing method for determining an authentication tag over the plurality of plaintext blocks to create a plurality of input blocks each of l bits in length; a second component for applying a block cipher using a secret key over each of the the input blocks to create a plurality of enciphered blocks each of L bits in length; a combining component for performing the same combination operation as that used at a signing method for determining an authentication tag over the plurality of enciphered blocks to compute an authentication tag; and a comparator for verifying integrity of the plaintext blocks by comparing the input authentication tag and the computed authentication tag.

In yet a further embodiment of the present invention, an authentication system is provided for a data signing function that updates an authentication tag incrementally, comprising: a partitioner for partitioning an input plaintext string into a plurality of equal-size plaintext blocks of l bits in length; a first component for performing a randomization function over said plurality of plaintext blocks to create a plurality of input blocks each of l bits in length; a block cipher component for applying a block cipher using a secret key over each of the said input blocks to create a plurality of enciphered blocks each of L bits in length; a combining component for performing a combination operation over said plurality of enciphered blocks to create an authentication tag, said combination operation having an inverse; and further comprising: a receiver for receiving an input plaintext string including a plaintext string and an input authentication tag; a partitioner component for partitioning said plaintext string into a plurality of n plaintext blocks comprising l bits each; a second receiver for receiving a new l-bit input plaintext block to replace an l-bit plaintext block of said input plaintext string at index i; a component for performing the same randomization function as that used at a signing method, using index i, on said new input plaintext block to create a first input block and performing the same randomization function as that used at a signing method, using index i, on said plaintext block at index i to create a second input block, each of the said created input blocks having l bits in length; a third component for applying a block cipher using a secret key to the first input block and the second input block to create a first enciphered block and a second enciphered block, each of L bits in length; a fourth component for performing the inverse of said combination operation used at a signing method for determining an authentication tag to the input authentication tag and said second enciphered block; a fifth component for performing the said combination operation used at a signing method for determining an authentication tag to first enciphered block and the result of performing the inverse of said combination operation; and a sixth component for outputting the result of performing said combination operation to the first enciphered block and the result of performing the inverse of said combination operation as the authentication tag.

In yet a further embodiment of the present invention, an authentication system is provided for a data signing function that determines an authentication tag, comprising: a partitioner for partitioning the padded input plaintext string into a plurality of equal-size plaintext blocks of l bits in length; a randomization component for performing a randomization function over each of said plurality of plaintext blocks using a different index for each plaintext block to create a plurality of input blocks each of l bits in length; a pseudo-random encipher component for applying a block cipher using a secret key over each of the said input blocks to create a plurality of enciphered blocks each of L bits in length; a combining component for combining said plurality of enciphered blocks to create an authentication tag; and further providing an out-of-order verification function for the authentication method comprising: a receiver for receiving an input authentication tag for verification and a plurality of n plaintext blocks comprising l bits each, each plaintext block being accompanied by a different index; a randomization component for performing a randomization function over each of said plurality of plaintext blocks using said index for each plaintext block to create a plurality of input blocks each of l bits in length; a pseudo-random encipher component for applying a block cipher using a secret key over each of the said input blocks to create a plurality of enciphered blocks each of L bits in length; a combining component for performing the same combination operation as that used at a signing method for determining an authentication tag over said plurality of enciphered blocks to compute an authentication tag; a comparator for verifying integrity of the plaintext blocks by comparing the input authentication tag and the computed authentication tag.

In a yet further embodiment of the present invention, a program product for providing a data signing function that determines an authentication tag for use in conjunction with transfer of data using a communication channel or with data storage on storage media is disclosed, comprising computer readable program code, including: first code for partitioning the data into a plurality of data blocks; second code which, for each of the data blocks, performs a randomization function over the data block to create an input block of the same size as that of the data block, the input block not including a block identifier; third code for applying a pseudo-random function to each the input block to create a plurality of enciphered blocks; and fourth code for combining the plurality of enciphered blocks to create an authentication tag.

In a yet further embodiment of the present invention, a program product for providing a data signing function that determines an authentication tag is disclosed, comprising computer readable program code including: code for partitioning an input plaintext string into a plurality of equal-size plaintext blocks of l bits in length; code for creating a random vector of l bits in length; code for performing a randomization function over the plurality of plaintext blocks and the random vector block to create a plurality of input blocks each of l bits in length; code for applying a block cipher using a secret key over each of the input blocks to create a plurality of enciphered blocks each of L bits in length; and code for performing a combination operation over the plurality of enciphered blocks to create an authentication tag.

In yet a further embodiment of the present invention, a program product for providing a data signing function that determines an authentication tag is disclosed, comprising computer readable program code including: first code for partitioning a padded input plaintext string into a plurality of n equal-size plaintext blocks of l bits in length; second code for performing a randomization function over the plurality of n plaintext blocks to create a plurality of input blocks each of l bits in length; third code for applying a block cipher using a secret key over each of the the input blocks to create a plurality of enciphered blocks each of L bits in length; and code for performing a combination operation over the plurality of enciphered blocks to create an authentication tag.

In yet a further embodiment of the present invention, a program product for an authentication method, which provides data integrity, is disclosed comprising: first code for receiving a string including a plaintext string and an input authentication tag for verification; second code for partitioning the plaintext string into a plurality of n plaintext blocks comprising l bits each; third code for performing the same randomization function as that used at a signing method for determining an authentication tag over the plurality of plaintext blocks to create a plurality of input blocks each of l bits in length; fourth code for applying a block cipher using a secret key over each of the the input blocks to create a plurality of enciphered blocks each of L bits in length; fifth code for performing the same combination operation as that used at a signing method for determining an authentication tag over the plurality of enciphered blocks to compute an authentication tag; and sixth code for verifying integrity of the plaintext blocks by comparing the input authentication tag and the computed authentication tag.

In yet a further embodiment of the present invention, a program product for providing a data signing function updates an authentication tag incrementally is disclosed, comprising: first code for partitioning an input plaintext string into a plurality of equal-size plaintext blocks of l bits in length; second code for performing a randomization function over said plurality of plaintext blocks to create a plurality of input blocks each of l bits in length; third code for applying a block cipher using a secret key over each of the said input blocks to create a plurality of enciphered blocks each of L bits in length; fourth code for performing a combination operation over said plurality of enciphered blocks to create an authentication tag, said combination operation having an inverse; and further comprising: fifth code for receiving an input plaintext string including a plaintext string and an input authentication tag; sixth code for partitioning said plaintext string into a plurality of n plaintext blocks comprising l bits each; seventh code for receiving a new l-bit input plaintext block to replace an l-bit plaintext block of said input plaintext string at index i; eighth code for performing the same randomization function as that used at a signing method, using index i, on said new input plaintext block to create a first input block and performing the same randomization function as that used at a signing method, using index i, on said plaintext block at index i to create a second input block, each of the said created input blocks having l bits in length; ninth code for applying a block cipher using a secret key to the first input block and the second input block to create a first enciphered block and a second enciphered block, each of L bits in length; tenth code for performing the inverse of said combination operation used at a signing method for determining an authentication tag to the input authentication tag and said second enciphered block; eleventh code for performing the said combination operation used at a signing method for determining an authentication tag to first enciphered block and the result of performing the inverse of said combination operation; and twelfth code for outputting the result of performing said combination operation to the first enciphered block and the result of performing the inverse of said combination operation as the authentication tag.

In yet a further embodiment of the present invention, a program product for providing a data signing function that determines an authentication tag is disclosed: first code for partitioning the padded input plaintext string into a plurality of equal-size plaintext blocks of l bits in length; second code for performing a randomization function over each of said plurality of plaintext blocks using a different index for each plaintext block to create a plurality of input blocks each of l bits in length; third code for applying a block cipher using a secret key over each of the said input blocks to create a plurality of enciphered blocks each of L bits in length; fourth code for combining said plurality of enciphered blocks to create an authentication tag; and further providing an out-of-order verification function for the authentication method comprising: fifth code for receiving an input authentication tag for verification and a plurality of n plaintext blocks comprising l bits each, each plaintext block being accompanied by a different index; sixth code for performing a randomization function over each of said plurality of plaintext blocks using said index for each plaintext block to create a plurality of input blocks each of l bits in length; seventh code for applying a block cipher using a secret key over each of the said input blocks to create a plurality of enciphered blocks each of L bits in length; eighth code for performing the same combination operation as that used at a signing method for determining an authentication tag over said plurality of enciphered blocks to compute an authentication tag; ninth code for verifying integrity of the plaintext blocks by comparing the input authentication tag and the computed authentication tag.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF THE PREFERRED EMBODIMENTS

Figure 1:
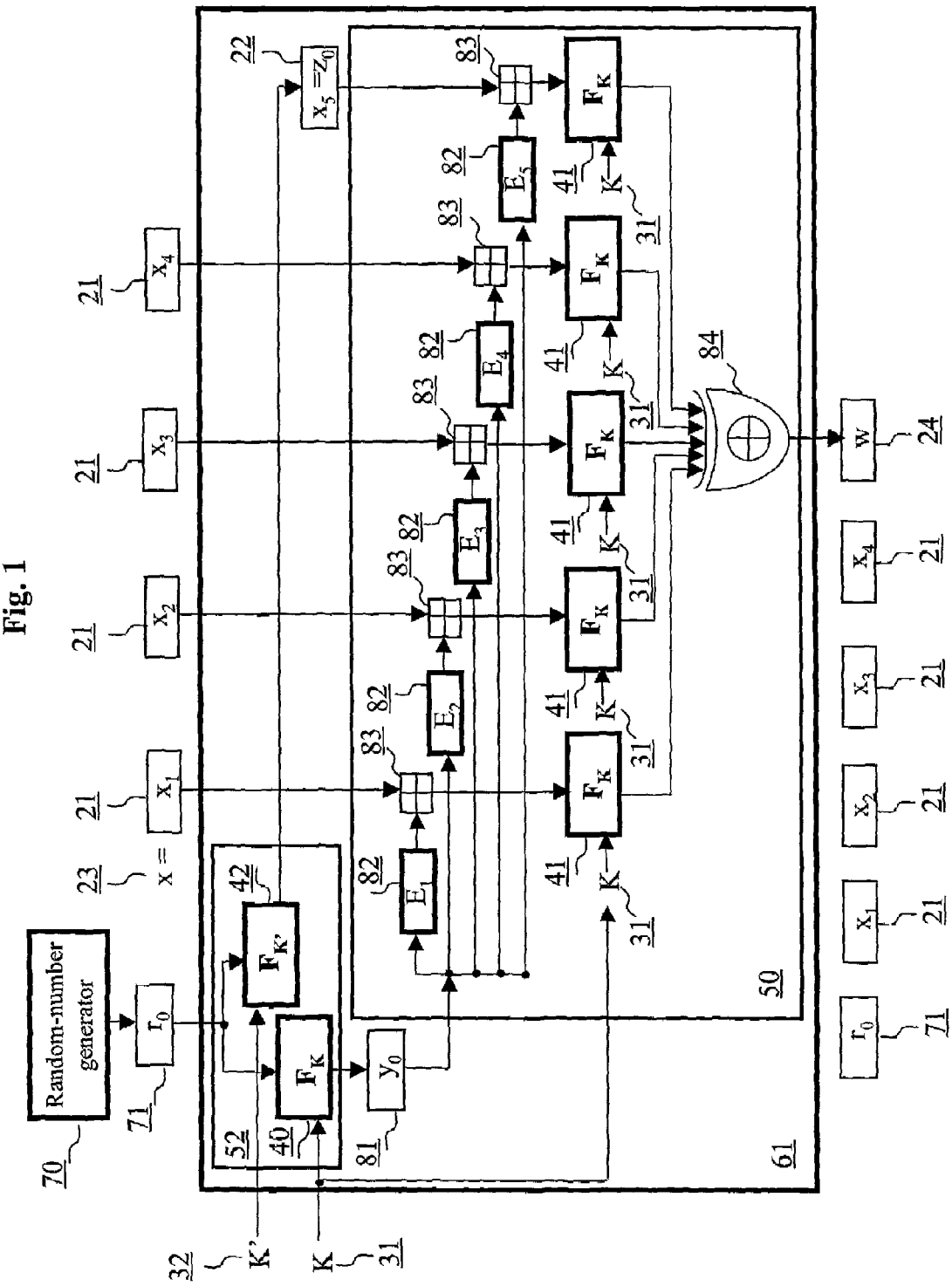
FIG. 1 illustrates a schematic diagram of the method of the present invention for the signing of input plaintext string $x=x_1\ x_2\ x_3\ x_4$ using keys K and K' to obtain output tag w.

The inventors have recognized, and it is an aspect of this invention, that it is highly advantageous to provide authentication schemes that (1) rely exclusively on the use of block ciphers, (2) can be implemented in a concurrent (i.e., parallel or pipelined) manner in addition to standard sequential processing, (3) can be used for incremental and out-of-order processing authentication tags, and (4) can be used for the authentication of real-time data sources where message length remains unknown until the entire message is received, and commencing message authentication cannot be deferred until the end of the message Referring to FIG. 1, a plaintext string x 23 representing input data is presented to a signing function 61 of an authentication scheme providing data integrity resulting in an output tag w 24 for plaintext string x 23. It is assumed that the sender and the receiver share a pair of secret keys K and K' (i.e., a first key K 31, and a second key K' 32) and that a random-number generator 70 is available. Keys K and K' have the same length k and may be derived, in one embodiment, from a master key using key separation techniques well-known in the art. The input plaintext string x 23 is padded where necessary in some standard fashion so that it is a multiple of l bits. The padding is not shown in FIG. 1, as it is commonly known in the data processing art. It is assumed that the plaintext string x 23 is composed of n l-bit plaintext blocks 21. FIG. 1 shows an example plaintext string 23 composed of n=4 blocks, $x=x_1\ x_2\ x_3\ x_4$.

To clarify for purposes of explanation, F is an l-bit to L-bit block cipher with key length k, where $L \geq l$. $F_K$ is the l-bit to L-bit block cipher F using secret key K, and $F_K'$ is the l-bit to L-bit block cipher F using secret key K'. $F_K(b)$ is an L-bit block representing the enciphering of the l-bit block b by $F_K$. Similarly, $F_{K'}(b)$ is an L-bit block representing the enciphering of the l-bit block b by $F_{K'}$. Note that the block cipher used with the present invention could be any block cipher. By way of example but not by way of limitation, examples of block ciphers include DES, IDEA, and the block ciphers referred to in the Handbook of Applied Cryptography noted previously, pseudo-random functions, and any other convenient block cipher including the Advanced Encryption Standard (AES) being considered for standardization by NIST.

The random-number generator 70 outputs a random number $r_0$ 71 of l bits in length. In an alternate embodiment, the random number $r_0$ 71 is shared between the sender and the receiver, and hence it need not be generated by a random-number generator 70. In the alternate embodiment the sender and the receiver generate the same shared random number $r_0$ 71 from an already shared secret key using key separation techniques well-known in the art.

The random number $r_0$ 71 is used in the initialization function for tag computation 52 together with the shared secret keys K 31 and K' 32 to generate the random initial vector $y_0$ 81 and the random vector $z_0$ 22 of l bits in length. The random number $r_0$ 71 is enciphered by $F_K$ 40, the block cipher F using the first key K 31, to obtain the random initial vector $y_0$ 81. The random number $r_0$ 71 is also enciphered using $F_{K'}$ 42, the block cipher F using the second key K' 32, to obtain a random vector $x_{n+1}=z_0$ 22 of l bits in length. FIG. 1 shows an example where n=4 and $x_5=z_0$.

The plurality of input plaintext blocks $x_1, \ldots, x_n$ 21 and the random vector $x_{n+1}=z_0$ 22, where n=4 are input to the tag computation function 50 that computes the tag w 24 using the random initial vector $y_0$ 81.

The plurality of input plaintext blocks $x_1, \ldots, x_n$ 21 and the random vector $x_{n+1}=z_0$ 22, where n=4, are subjected to a randomization step comprising, in one embodiment, applying a combination operation 83 on each of the input plaintext blocks $x_i$ 21 and the random vector $x_{n+1}=z_0$ 22 with each l-bit element $E_i$ 82 of a sequence of n+1 unpredictable elements. Each of these elements $E_i$ 82 is unpredictable because it is obtained by combining $y_0$ 81, the random initial vector, and the element identifier i, such that for any given l-bit constant a, the probability of the event $E_i=a$ is negligible, wherein the notion of negligible probability is well-known to those skilled in the art (viz., M. Naor and O. Reingold: "From Unpredictability to Indistinguishability: A Simple Construction of Pseudo-Random Functions from MACs," Advances in Cryptology—CRYPTO '98 (LNCS 1462), pp. 267–282, 1998; M. Bellare, A. Desai, E. Jokipii, and P. Rogaway: "A Concrete Security Treatment of Symmetric Authentication," Proceedings of the 38th Symposium on Foundations of Computer Science, IEEE, 1997, pp. 394–403). The fact that these elements $E_i$ 82 are unpredictable means that enough of their l bits remain unknown so that the probability of the event $E_i=a$ is negligible. In the preferred embodiment of this invention, the unpredictable elements $E_i$ 82 are computed in a parallel manner. In an alternate embodiment of this invention, the unpredictable elements $E_i$ 82 are computed in a pipelined manner. In a yet another alternate embodiment of this invention, when the signing of plaintext blocks $x_1, \ldots, x_n$ 21 is not performed concurrently, each element of the sequence $E_{i+1}$ (where $i \geq 1$) is generated from the previous element $E_i$ by modular $2^l$ addition of the random initial vector $y_0$, the first element of the sequence being $y_0$ itself, namely $E_1=y_0$.

In the preferred embodiment of this invention, the combination operation 83 is the modular $2^l$ addition, whereby each block input to the block cipher $F_K$ 41 using the first key K 31 is obtained as $x_i + E_i$ modulo $2^l$. In an alternate embodiment of this invention, the combination operation 83 is the bit-wise exclusive-or operation, whereby each input block for the block cipher $F_K$ 41 using the first key K 31 is obtained as $x_i \oplus E_i$. In yet another alternate embodiment of this invention, the combination operation 83 is modular $2^l$ subtraction operation, whereby each input block for the block cipher $F_K$ 41 using the first key K 31 is obtained as $x_i - E_i$ modulo $2^l$. The invention, however, is not so limited, as other combination operations that allow the combination 83 in parallel for all plaintext input blocks may also be used for operation 83. It is also understood by those skilled in the art that any combination 83 that can be performed in parallel can also be performed in a pipelined manner and also in a sequential manner as may be appropriate for the alternate embodiments of this invention.

Accordingly, the randomization step applied to the plurality of input plaintext blocks $x_1, \ldots, x_n$ 21 and the random vector $x_{n+1} = z_0$ 22, where n=4, results in a plurality of l-bit input blocks to be applied to a block cipher $F_K$ 41. These input blocks from element 83 are enciphered by the block cipher $F_K$ 41 using the first key K 31, to thereby generate a plurality of enciphered blocks. Note that in one embodiment, the input blocks enciphered, including the random vector 22, have the same size as the input plaintext blocks. In the preferred embodiment of this invention, the plurality of input blocks is generated in parallel and then it is submitted concurrently to a plurality of the block ciphers $F_K$ 41 using the first key K 31 to thereby generate a plurality of enciphered blocks. In an alternate embodiment, when the plurality input is not generated in parallel, the plurality of input blocks is submitted sequentially to a block cipher FK 41 using the first key K 31 to thereby generate a plurality of enciphered blocks.

The plurality of enciphered blocks resulting from the block ciphers 41 are further combined at 84 to yield the L-bit output tag w 24 for plaintext string x 23. In the preferred embodiment of this invention, the combination operation is the bit-wise exclusive-or operation. In an alternate embodiment of the method of this invention, the combination operation is the modular $2^L - 1$ addition. In yet another alternate embodiment of the method of this invention, the combination operation is the modular $2^L - 1$ subtraction. The invention, however, is not so limited, as other combination operations may also be used for operation 84.

The plaintext blocks $x_1, \ldots, x_n$ 21, the random number $r_0$ 71, and the output tag w 24 form the data transmitted through the communication channels, or stored on a storage media.

Figure 2:
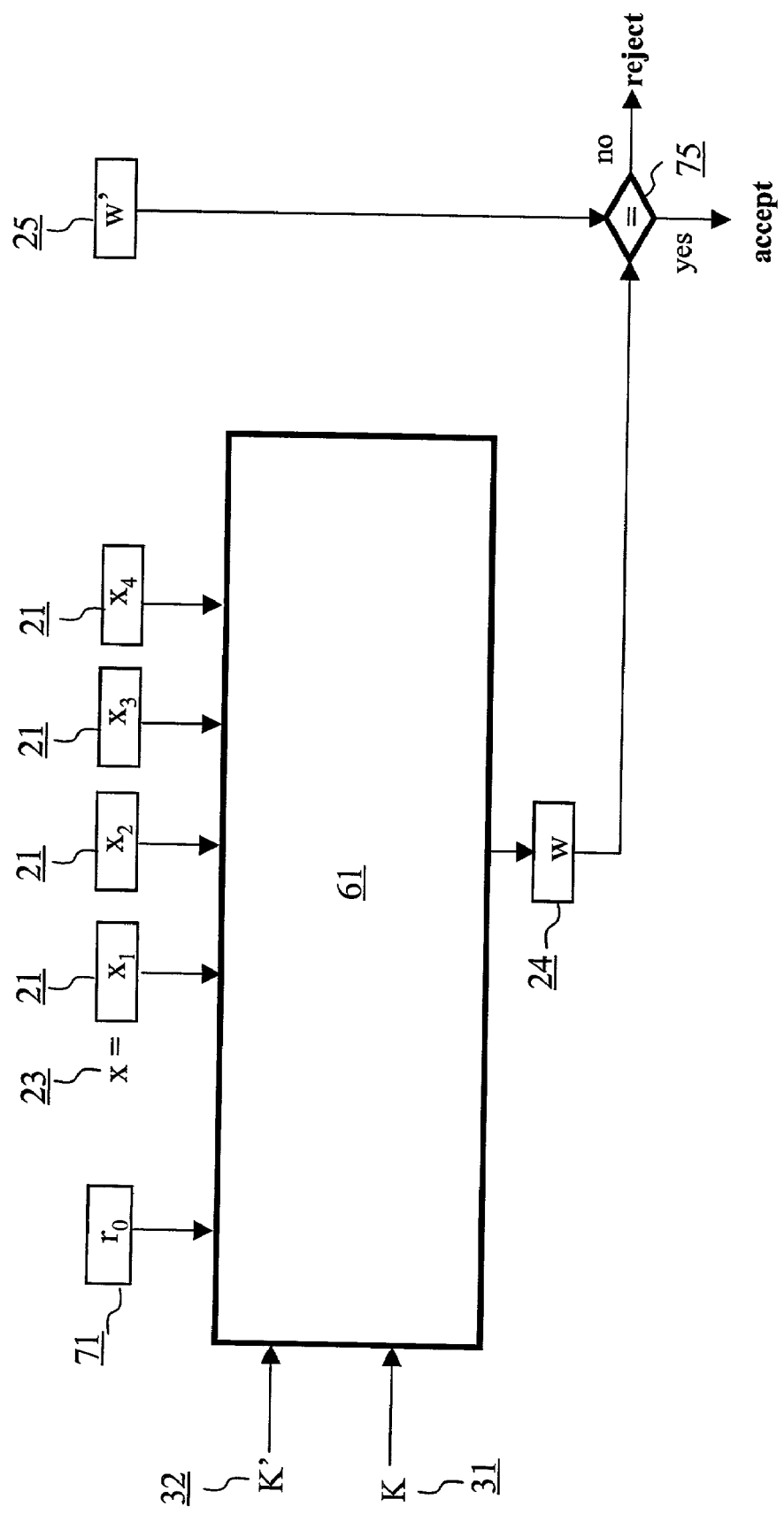
FIG. 2 illustrates a schematic diagram of the method of the present invention for the authentication of the input plaintext string $x=x_1\ x_2\ x_3\ x_4$ and input authentication tag w' using keys K and K'.

FIG. 2 represents the verification at a receiver of an L-bit input authentication tag w' 25 for a plaintext string x 23 using an l-bit random number $r_0$ 71. The input plaintext string x 23 and the random number $r_0$ 71 are submitted to the signing function 61, described in FIG. 1, using a pair of secret keys K and K' (i.e., a first key K 31, and a second key K' 32) resulting in the computed tag w 24 of L-bit length. The computed tag w 24 and the input authentication tag w' 25 are compared for equality at block 75. If the computed tag w 24 is equal to the input authentication tag w' 25, then the plaintext string x 23 is accepted as authentic; and, if the computed tag w 24 is not equal to the input authentication tag w' 25, then the input plaintext string x 23 is rejected. FIG. 2 shows an example plaintext string x 23 composed of n=4, l-bit blocks, $x = x_1 x_2 x_3 x_4$.

Figure 3:
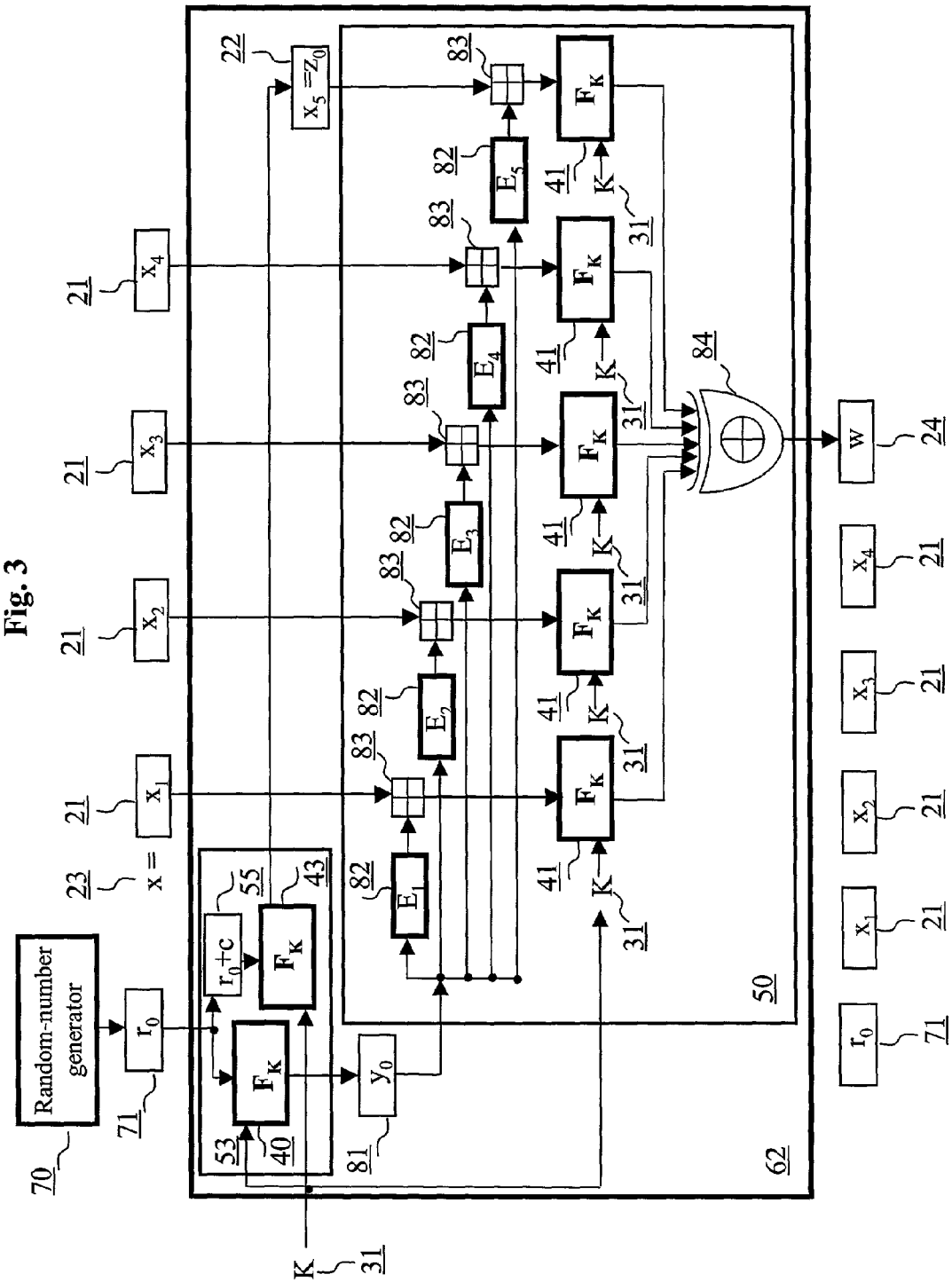
FIG. 3 illustrates a schematic diagram of the method of the present invention for the signing of input plaintext string $x=x_1\ x_2\ x_3\ x_4$ using one key K to obtain output tag w.

FIG. 3 illustrates a schematic diagram of the method of the present invention for the signing at 62 of input plaintext string x 23 using a single secret key K 31 shared by the sender and receiver to obtain an output tag w 24. The input plaintext string x 23 is padded in some standard fashion so that it is a multiple of l bits, and is partitioned into n l-bit plaintext blocks 21. FIG. 3 shows an example plaintext string 23 composed of n=4 blocks, $x = x_1 x_2 x_3 x_4$.

The random-number generator 70 outputs a random number $r_0$ 71 of l bits in length. In an alternate embodiment, the random number $r_0$ 71 is shared between the sender and the receiver, and hence the random number need not be generated by a random-number generator 70. In the alternate embodiment the sender and the receiver generate the same shared random number $r_0$ 71 from an already shared secret key using key separation techniques well-known in the art.

The random number $r_0$ 71 is used in the initialization function for tag computation 53 together with one shared secret key K 31 to generate the random initial vector $y_0$ 81 and $r_0 + c$ 55 is used to generate the random vector $z_0$ 22 of l bits in length. The random number $r_0$ 71 is enciphered by $F_K$ 40, the block cipher F using key K 31, to obtain the random initial vector $y_0$ 81. The variant $r_0 + c$ 55 (where constant c is not zero) of the random number $r_0$ 71 is also enciphered using $F_K$ 43, the block cipher F using the same key K 31, to obtain the random vector $x_{n+1} = z_0$ 22 of l bits in length. FIG. 3 shows an example in which the variant of the random number (55) is obtained from the addition modulo $2^l$ of the random number $r_0$ 71 with a constant c, where c is not zero, and n=4, $x_5 = z_0$. The invention, however, is not so limited, as other variants of the number 55 may also be used as input to $F_K$ 43, the block cipher F using key K 31, to obtain the random vector $x_{n+1} = z_0$ 22 of l bits in length.

The plurality of input plaintext blocks $x_1, \ldots, x_n$ 21 and the random vector $x_{n+1} = z_0$ 22, where n 4, are input to the tag computation function 50, which as described in FIG. 1, computes the tag w 24 using the random initial vector $y_0$ 81. The plaintext blocks $x_1, \ldots, x_n$ 21, the random number $r_0$ 71, and the output tag w 24 form the data transmitted through the communication channels, or stored on the storage media.

Figure 4:
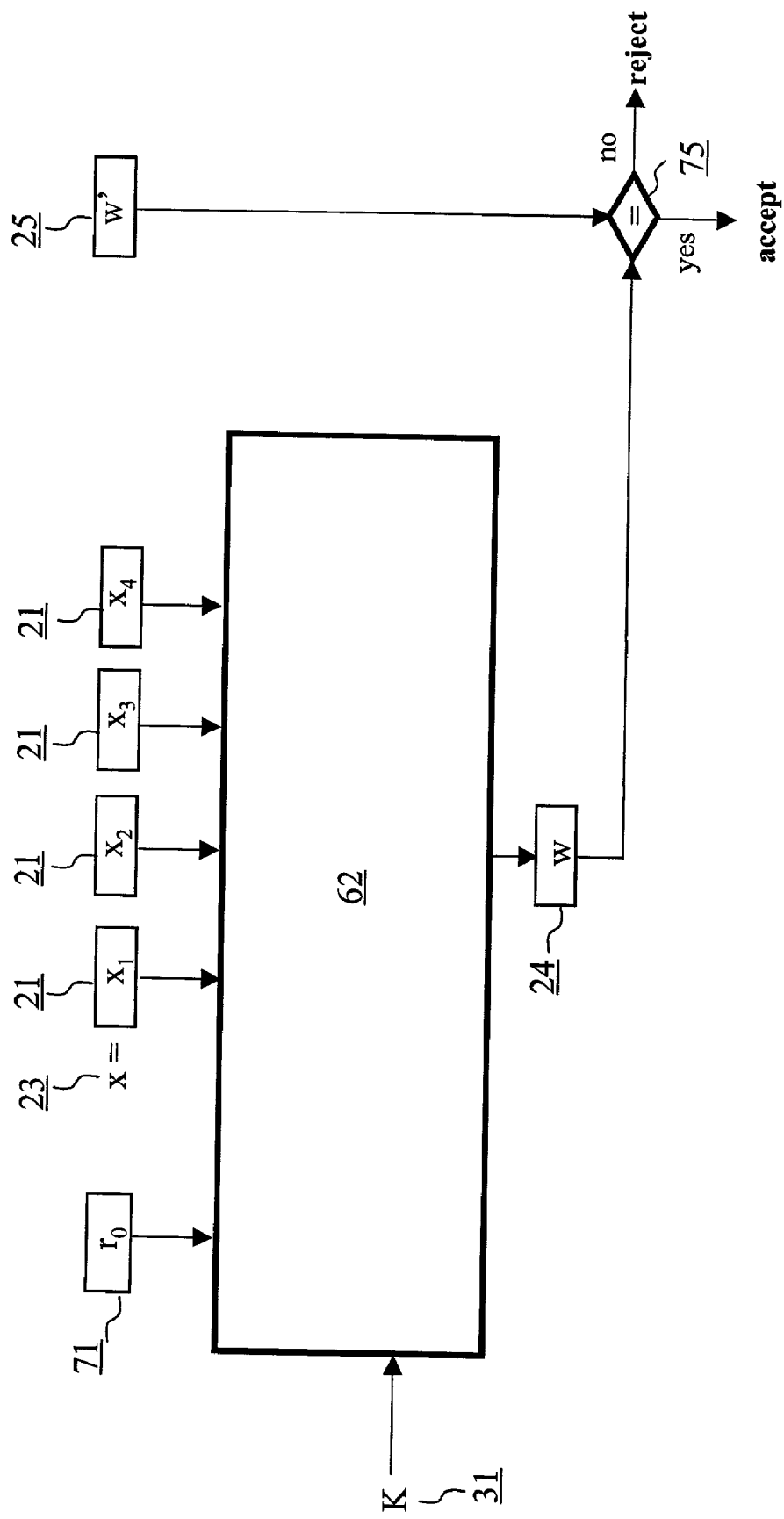
FIG. 4 illustrates a schematic diagram of the method of the present invention for the authentication of the input plaintext string $x=x_1\ x_2\ x_3\ x_4$ and input authentication tag w' using one key K.

FIG. 4 represents the verification of an L-bit input authentication tag w' 25 for a plaintext string x 23 using an l-bit random number $r_0$ 71. The input plaintext string x 23 and the random number $r_0$ 71 are submitted to the signing function 62, as described in FIG. 3, using a single secret key K 31 shared by the sender and receiver resulting in the computed tag w 24 of l-bit length. The computed tag w 24 and the input authentication tag w' 25 are compared for equality at 75. If the computed tag w 24 is equal to the input authentication tag w' 25 received with the plaintext string, then the input plaintext string x 23 is accepted as authentic; and, if the computed tag w 24 is not equal to the input authentication tag w' 25, then the input plaintext string x 23 is rejected. FIG. 4 shows an example plaintext string x 23 composed of n=4, l-bit blocks, $x = x_1 x_2 x_3 x_4$.

Figure 5:
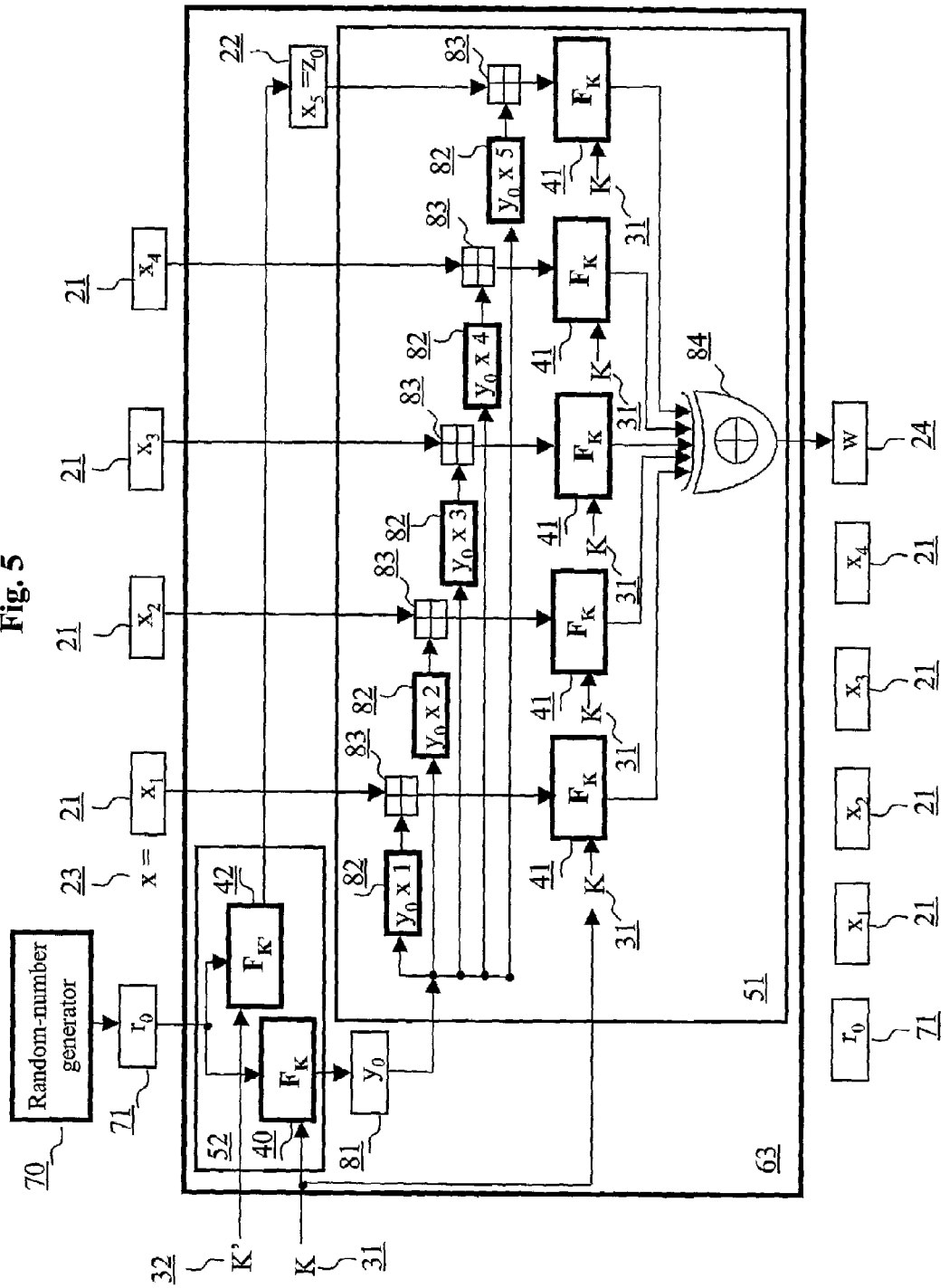
FIG. 5 illustrates a schematic diagram for the preferred embodiment of this invention of the stateless authentication scheme in which input plaintext string $x=x_1\ x_2\ x_3\ x_4$ is signed using keys K and K' to obtain output tag w.

FIG. 5 illustrates a schematic diagram for the preferred embodiment of this invention of the stateless authentication scheme. The input string x 23 (which is padded in a standard way) containing n plaintext blocks $x_i$ 21 is signed by the signing function 63 of the authentication scheme resulting in an output tag w 24. The signing function 63 uses a pair of secret keys K and K' (i.e., a first key K 31, and a second key K' 32). FIG. 5 shows an example plaintext string 23 composed of n=4 blocks, $x = x_1 x_2 x_3 x_4$.

In the preferred embodiment of this invention of the stateless authentication scheme, the random-number generator 70 outputs a random number $r_0$ 71 of l bits in length. In an alternate embodiment, the random number $r_0$ 71 is shared between the sender and the receiver, and hence it need not be generated by a random-number generator 70. In the alternate embodiment the sender and the receiver generate the same shared random number $r_0$ 71 from an already shared secret key using key separation techniques well-known in the art.

The random number $r_0$ 71 is used in the initialization function for tag computation 52, as described in FIG. 1, together with the shared secret key K 31 to generate the random initial vector $y_0$ 81 and together with the shared secret key K' 32 to generate the random vector $z_0$ 22 of l bits in length. FIG. 5 shows an example where n=4 and $x_5=z_0$.

The plurality of input plaintext blocks $x_1, \ldots, x_n$ 21 and the random vector $x_{n+1}=z_0$ 22, where n=4 are input to the tag computation function 51 that computes the tag w 24 using the random initial vector $y_0$ 81.

The plurality of input plaintext blocks $x_1, \ldots, x_n$ 21 and the random vector $x_{n+1}=z_0$ 22, where n=4, are subjected to a randomization step comprising, in one embodiment, applying a combination operation 83 to each of the input plaintext block $x_i$ 21 and the random vector $x_{n+1}=z_0$ 22 with each l-bit element $y_0 \times i$ 82 of a sequence of n+1 elements, where i=1, ..., n+1. Each of these elements $y_0 \times i$ 82 is unpredictable because it is obtained by modular $2^l$ multiplication of $y_0$ 81, the random initial vector, with the element identifier i, such that for any given l-bit constant a, the probability of the event $y_0 \times i = a$ is negligible, wherein the notion of negligible probability is well-known to those skilled in the art (viz., M. Naor and O. Reingold: "From Unpredictability to Indistinguishability: A Simple Construction of Pseudo-Random Functions from MACs," Advances in Cryptology —CRYPTO '98 (LNCS 1462), pp. 267–282, 1998; M. Bellare, A. Desai, E. Jokipii, and P. Rogaway: "A Concrete Security Treatment of Symmetric Authentication," Proceedings of the 38th Symposium on Foundations of Computer Science, IEEE, 1997, pp. 394–403). The fact that these elements $y_0 \times i$ 82 are unpredictable means that enough of their l bits remain unknown so that the probability of the event $y_0 \times i = a$ is negligible. In the preferred embodiment of this invention, the unpredictable elements $y_0 \times i$ 82 are computed in a parallel manner. In an alternate embodiment of this invention, the unpredictable elements $y_0 \times i$ 82 are computed in a pipelined manner. In a yet another alternate embodiment of this invention, when the signing of plaintext x 23 is performed sequentially, each element of the sequence $y_0 \times (i+1)$ (where $i \geq 1$) is generated from the previous element $y_0 \times i$ by modular $2^l$ addition of the random initial vector $y_0$, the first element of the sequence being $y_0$ itself. It should be appreciated by those skilled in the art, and is a further aspect of this invention, that the unpredictable elements 82 can be obtained in other ways that do not depart from the spirit and scope of the present invention as set forth in the claims. In an alternate embodiment of this invention, the unpredictable elements are the elements of the linear congruence sequence defined by $a^i \times y_0$, where $y_0$ is the random initial vector 81, i is the element index, i=1, ..., n+1, and a is called the multiplier and is chosen to pass all the necessary spectral tests as described by D. E. Knuth in "The Art of Computer Programming—Volume 2: Seminumerical Algorithms," Addison-Wesley, 1981 (second edition), Chapter 3, incorporated herein by reference.

In the preferred embodiment of this invention, the combination operation 83 is the modular $2^l$ addition, whereby each block input to the block cipher $F_K$ 41 using the first key K 31 is obtained as $x_i+(y_0 \times i)$ modulo $2^l$. In an alternate embodiment of this invention, the combination operation 83 is the bit-wise exclusive-or operation, whereby each input block for the block cipher $F_K$ 41 using the first key K 31 is obtained as $x_i \oplus y_0 \times i$). In yet another alternate embodiment of this invention, the combination operation 83 is a modular $2^l$ subtraction operation, whereby each input block for the block cipher $F_K$ 41 using the first key K 31 is obtained as $x_i-(y_0 \times i)$ modulo $2^l$. The invention, however, is not so limited, as other combination operations that allow the combination 83 in parallel for all plaintext input blocks may also be used for operation 83. It is also understood by those skilled in the art that any combination 83 that can be performed in parallel can also be performed in a pipelined manner and also in a sequential manner as may be appropriate for the alternate embodiments of this invention.

The randomization step applied to the plurality of input plaintext blocks $x_1, \ldots, x_n$ 21 and the random vector $x_{n+1}=z_0$ 22, where n=4, result in a plurality of l-bit input blocks to the block cipher $F_K$. The input blocks are enciphered using the block cipher $F_K$ using the first key K 31 to generate a plurality of enciphered blocks. Note that in one embodiment, the input blocks enciphered, including the random vector 22, have the same size as the input plaintext blocks. In the preferred embodiment of this invention, the plurality of input blocks are generated in parallel, and then submitted concurrently to a plurality of block ciphers $F_K$ using the first key K 31 to thereby generate a plurality of enciphered blocks. In an alternate embodiment, the plurality of input blocks is submitted sequentially to a block cipher $F_K$ using the first key K 31 to generate a plurality of enciphered blocks.

The plurality of enciphered blocks are further combined at element 84 to yield the L-bit output tag w 24 for the plaintext string x 23. In the preferred embodiment of this invention, the combination operation in element 84 is the bit-wise exclusive-or operation. In an alternate embodiment of the method of this invention, the combination operation in element 84 is the modular $2^L-1$ addition. In yet another alternate embodiment of the method of this invention the combination operation is the modular $2^L-1$ subtraction. The invention, however, is not so limited, as other combination operations may also be used for operation 84.

The plaintext blocks $x_1, \ldots, x_n$ 21, the random number $r_0$ 71, and the output tag w 24 form the data transmitted through the communication channels, or stored on a storage media.

Figure 6:
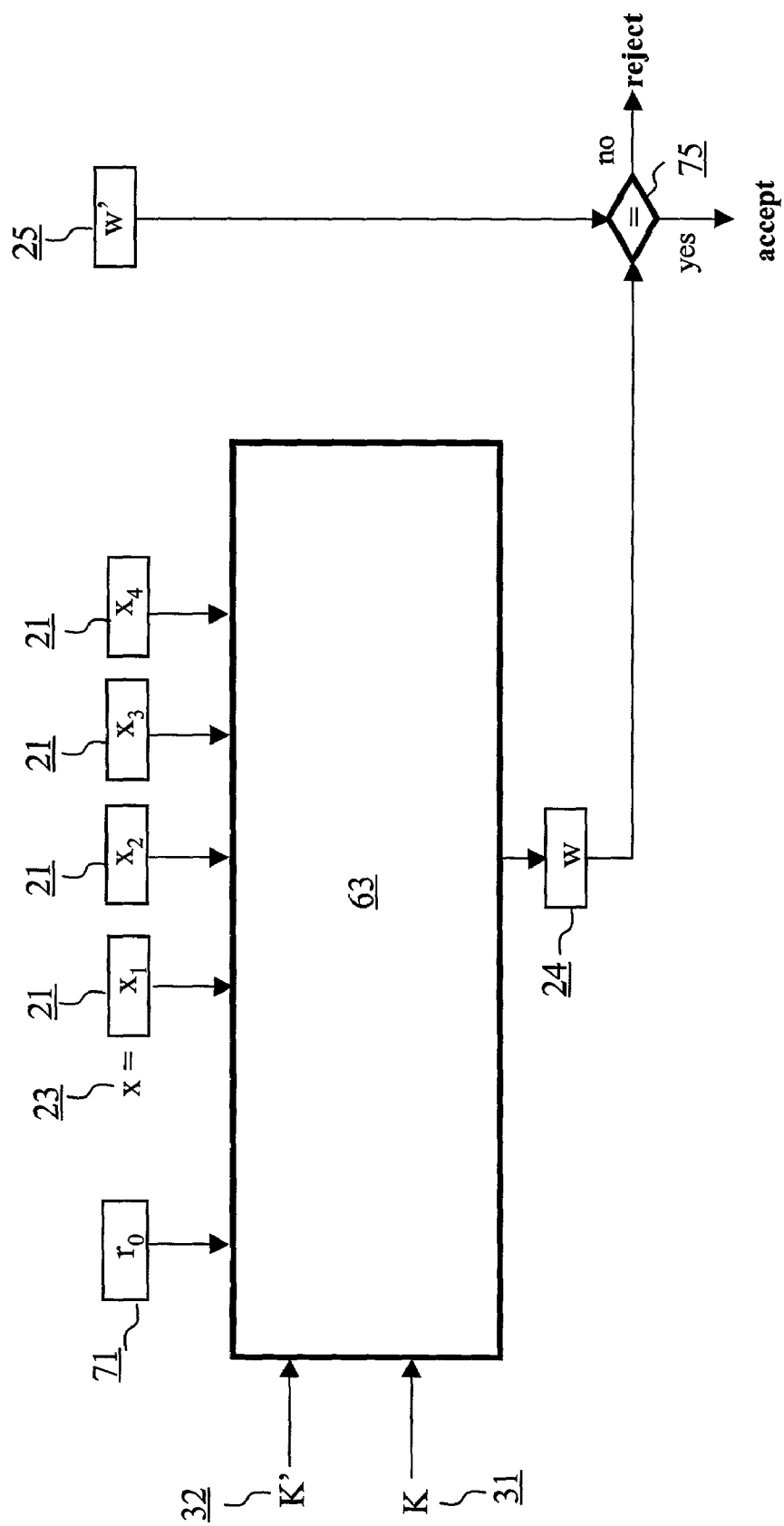
FIG. 6 illustrates a schematic diagram for the preferred embodiment of the invention of the stateless scheme for the verification of input plaintext string $x=x_1\ x_2\ x_3\ x_4$ and input authentication tag w' using keys K and K'.

FIG. 6 represents the verification of a plaintext string x 23 and the input authentication tag w' 25. The input plaintext string x 23 and the random number $r_0$ 71 are submitted to the signing function 63, as described in FIG. 5, using a pair of secret keys K and K' (i.e., a first key K 31, and a second key K' 32) resulting in the computed tag w 24. The computed tag w 24 and the input authentication tag w' 25 are compared for equality at element 75. If the computed tag w 24 is equal to the input authentication tag w' 25, then the input plaintext string x 23 is accepted as authentic; and if the computed tag w 24 is not equal to the input authentication tag w' 25, then the input plaintext string x 23 is rejected. FIG. 6 shows an example plaintext string 23 composed of n=4 blocks, $x=x_1 x_2 x_3 x_4$.

Figure 7:
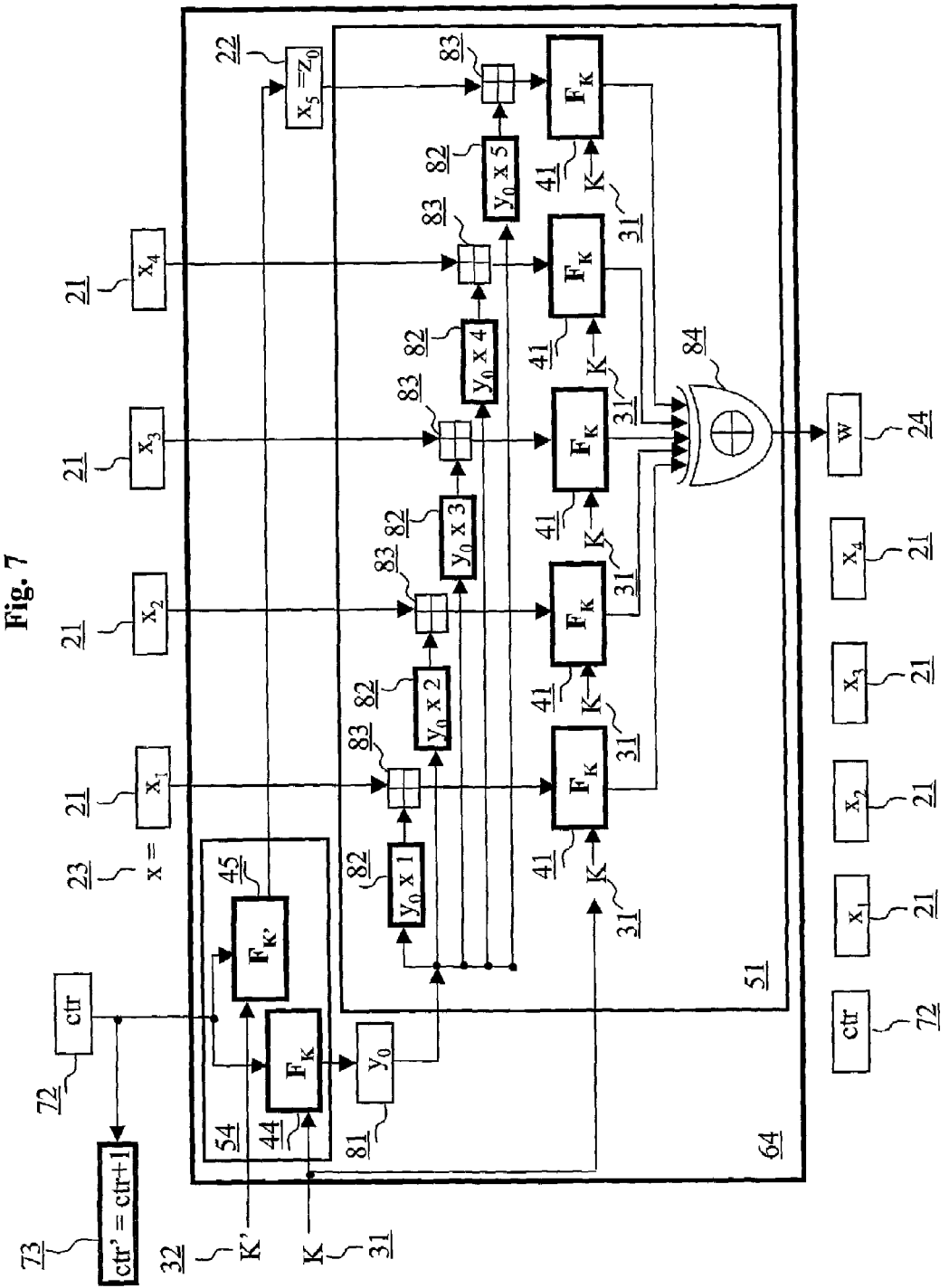
FIG. 7 illustrates a schematic diagram for the preferred embodiment of the invention of the stateful authentication scheme in which input plaintext string $x=x_1\ x_2\ x_3\ x_4$ is signed using keys K and K' to obtain output tag w.

FIG. 7 illustrates a schematic diagram for the preferred embodiment of this invention of the two-key stateful authentication scheme. The input string x 23 (which is padded in a standard way) containing n plaintext blocks $x_i$ 21 is signed by the signing function 64 of the authentication scheme resulting in an output tag w 24. The signing function 64 uses a pair of secret keys K and K' (i.e., a first key K 31, and a second key K' 32). FIG. 7 shows an example plaintext string 23 composed of n=4 blocks, $x=x_1 x_2 x_3 x_4$.

In this embodiment of the method of the invention, a counter ctr 72 is used in the initialization function for tag computation 54 together with the shared secret key K 31 to generate the random initial vector $y_0$ 81 and the shared secret key K' 32 to generate the random vector $z_0$ 22 of l bits in length. The counter ctr 72 is enciphered using $F_K$ 44, the block cipher F using the first key K 31, to obtain the random initial vector $y_0$ 81. The counter ctr 72 is also enciphered using $F_{K'}$ 45, the block cipher F using the second key K' 32, to obtain a random vector $x_{n+1}=z_0$ 22 of l bits in length. FIG. 7 shows an example where n=4 and $x_5=z_0$.

The plurality of input plaintext blocks $x_1, \ldots, x_n$ 21 and the random vector $x_{n+1}=z_0$ $2^2$, where n=4 are input to the tag computation function 51 that computes the tag w 24 using the random initial vector $y_0$ 81.

The plurality of input plaintext blocks $x_1, \ldots, x_n$ 21 and the random vector $x_{n+1}=z_0$ 22, where n=4, are subjected to a randomization step comprising, in one embodiment, applying a combination operation 83 to each of the input plaintext blocks x 21 and the random vector $x_{n+1}=z_0$ 22 with each l-bit element $y_0 \times i$ 82 of a sequence of n+1 elements, where i=1, . . . , n+1. Each of these elements 82 $y_0 \times i$ is unpredictable because it is obtained by modular $2^l$ multiplication of $y_0$ 81, the random initial vector, with the element identifier i, such that for any given l-bit constant a, the probability of the event $y_0 \times i = a$ is negligible, wherein the notion of negligible probability is well-known to those skilled in the art (viz., M. Naor and O. Reingold: "From Unpredictability to Indistinguishability: A Simple Construction of Pseudo-Random Functions from MACs," Advances in Cryptology —CRYPTO '98 (LNCS 1462), pp. 267–282, 1998; M. Bellare, A. Desai, E. Jokipii, and P. Rogaway: "A Concrete Security Treatment of Symmetric Authentication," Proceedings of the 38th Symposium on Foundations of Computer Science, IEEE, 1997, pp. 394–403). The fact that these elements $y_0 \times i$ 82 are unpredictable means that enough of their l bits remain unknown so that the probability of the event $y_0 \times i = a$ is negligible. In the preferred embodiment of this invention, the unpredictable elements $y_0 \times i$ 82 are computed in a parallel manner. In an alternate embodiment of this invention, the unpredictable elements $y_0 \times i$ 82 are computed in a pipelined manner. In a yet another alternate embodiment of this invention, when the signing of plaintext x 23 is performed sequentially, each element of the sequence $y_0 \times (i+1)$ (where $i \geq 1$) is generated from the previous element $y_0 \times i$ by modular $2^l$ addition of the random initial vector $y_0$, the first element of the sequence being $y_0$ itself. It should be appreciated by those skilled in the art, and is a further aspect of this invention, that the unpredictable elements 82 can be obtained in other ways that do not depart from the spirit and scope of the present invention as set forth in the claims. In an alternate embodiment of this invention, the unpredictable elements are the elements of the linear congruence sequence defined by $a^i \times y_0$, where $y_0$ is the random initial vector 81, i is the element index, i=1, . . . , n+1, and a is called the multiplier and is chosen to pass all the necessary spectral tests as described by D. E. Knuth in "The Art of Computer Programming—Volume 2: Seminumerical Algorithms," Addison-Wesley, 1981 (second edition), Chapter 3, incorporated herein by reference.

In the preferred embodiment of this invention, the combination operation 83 is the modular $2^l$ addition, whereby each block input to the block cipher $F_K$ 41 using the first key K 31 is obtained as $x_i + (y_0 \times i)$ modulo $2^l$. In an alternate embodiment of this invention, the combination operation 83 is the bit-wise exclusive-or operation, whereby each input block for the block cipher $F_K$ 41 using the first key K 31 is obtained as $x_i \oplus (y_0 \times i)$. In yet another alternate embodiment of this invention, the combination operation 83 is modular $2^l$ subtraction operation, whereby each input block for the block cipher $F_K$ 41 using the first key K 31 is obtained as $x_i - (y_0 \times i)$ modulo $2^l$. The invention, however, is not so limited, as other combination operations that allow the combination 83 in parallel for all plaintext input blocks may also be used for operation 83. It is also understood by those skilled in the art that any combination 83 that can be performed in parallel can also be performed in a pipelined manner and also in a sequential manner as may be appropriate for the alternate embodiments of this invention.

The randomization step applied to the plurality of input plaintext blocks $x_1, \ldots, x_n$ 21 and the random vector $x_{n+1}=z_0$ 22, where n=4, results in a plurality of l-bit input blocks to the block cipher $F_K$. The input blocks are enciphered using the block cipher $F_K$ using the first key K 31 to generate a plurality of enciphered blocks. Note that in one embodiment, the input blocks enciphered, including the random vector 22, have the same size as the input plaintext blocks. In the preferred embodiment of this invention, the plurality of input blocks is generated in parallel and then it is submitted concurrently to a plurality of block ciphers $F_K$ using the first key K 31 to generate a plurality of enciphered blocks. In an alternate embodiment, the plurality of input blocks is submitted sequentially to a block cipher $F_K$ using the first key K 31 generating a plurality of enciphered blocks.

The plurality of enciphered blocks is further combined at element 84 to yield the L-bit output tag w 24 for the plaintext string x 23. In the preferred embodiment of this invention, the combination operation is the bit-wise exclusive-or operation in element 84. In an alternate embodiment of the method of this invention, the combination operation is the modular $2^L - 1$ addition in element 84. In yet another alternate embodiment of the method of this invention, the combination operation is the modular $2^L - 1$ subtraction in element 84. The invention, however, is not so limited, as other combination operations may also be used for operation 84.

The plaintext blocks $x_1, \ldots, x_n$ 21, the counter ctr 72, and the output tag w 24 form the data transmitted through the communication channels, or stored on a storage media.

With the signing of each plaintext string, the current value of the counter ctr is incremented, or otherwise changed to a new value, at block 73. FIG. 7 shows an example in which the counter is incremented by 1. This new value of the counter is used in the signing of the next plaintext string.

Figure 8:
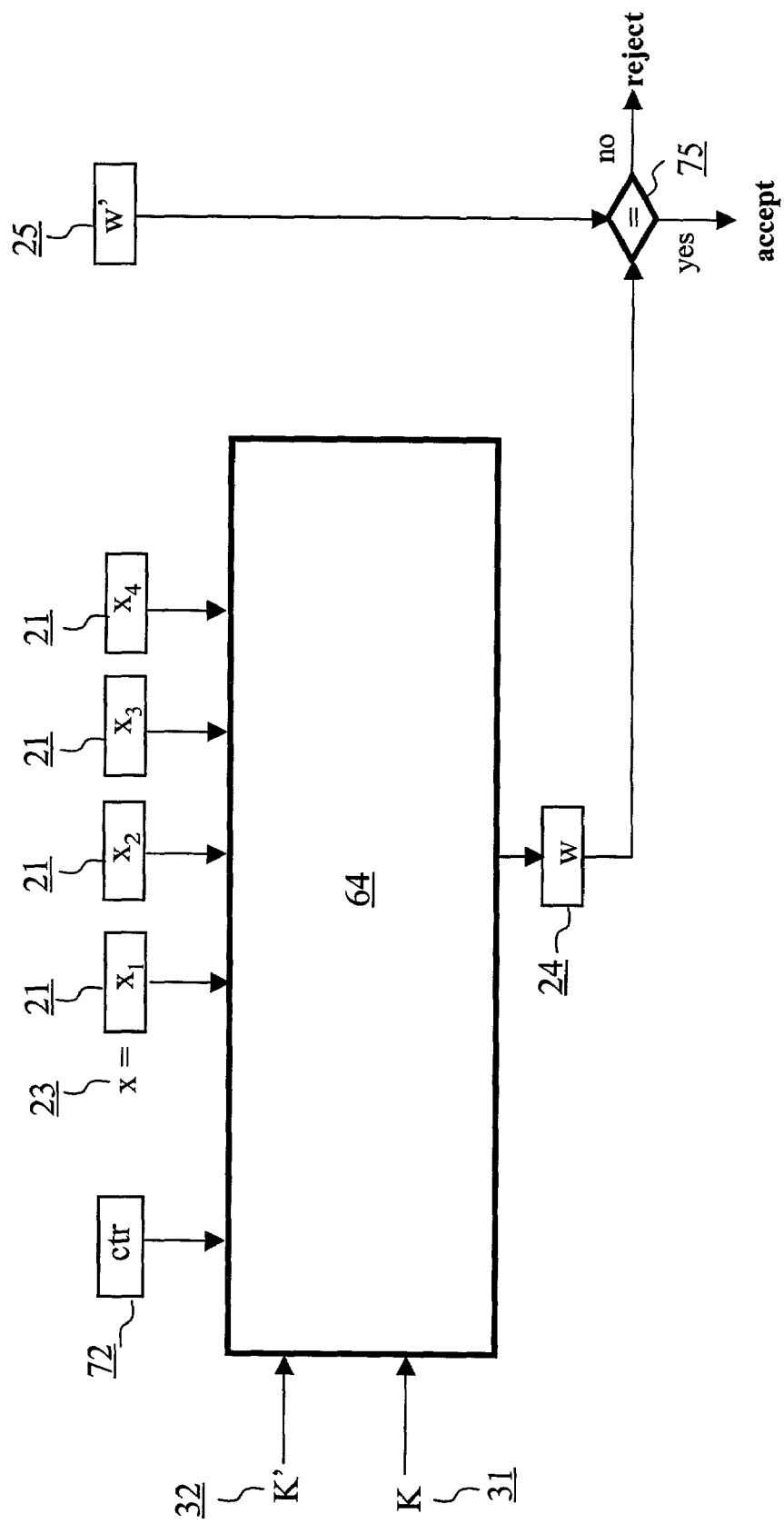
FIG. 8 illustrates a schematic diagram for the preferred embodiment of the invention of the stateful scheme for the verification of input plaintext string $x=x_1\ x_2\ x_3\ x_4$ and input authentication tag w' using keys K and K'.

FIG. 8 represents the verification of a plaintext string x 23 and the input authentication tag w' 25. The input plaintext string x 23 and the counter ctr 72 are submitted to the signing function 64 using a pair of secret keys K and K' (i.e., a first key K 31, and a second key K' 32) resulting in the computed tag w 24. The computed tag w 24 and the input authentication tag w' 25 are compared for equality at 75. If the computed tag w 24 is equal to the input authentication tag w' 25, then the input plaintext string x 23 is accepted as authentic; and if the computed tag w 24 is not equal to the input authentication tag w' 25, then the input plaintext string x 23 is rejected. FIG. 8 shows an example plaintext string 23 composed of n=4 blocks, $x = x_1 x_2 x_3 x_4$.

Figure 9:
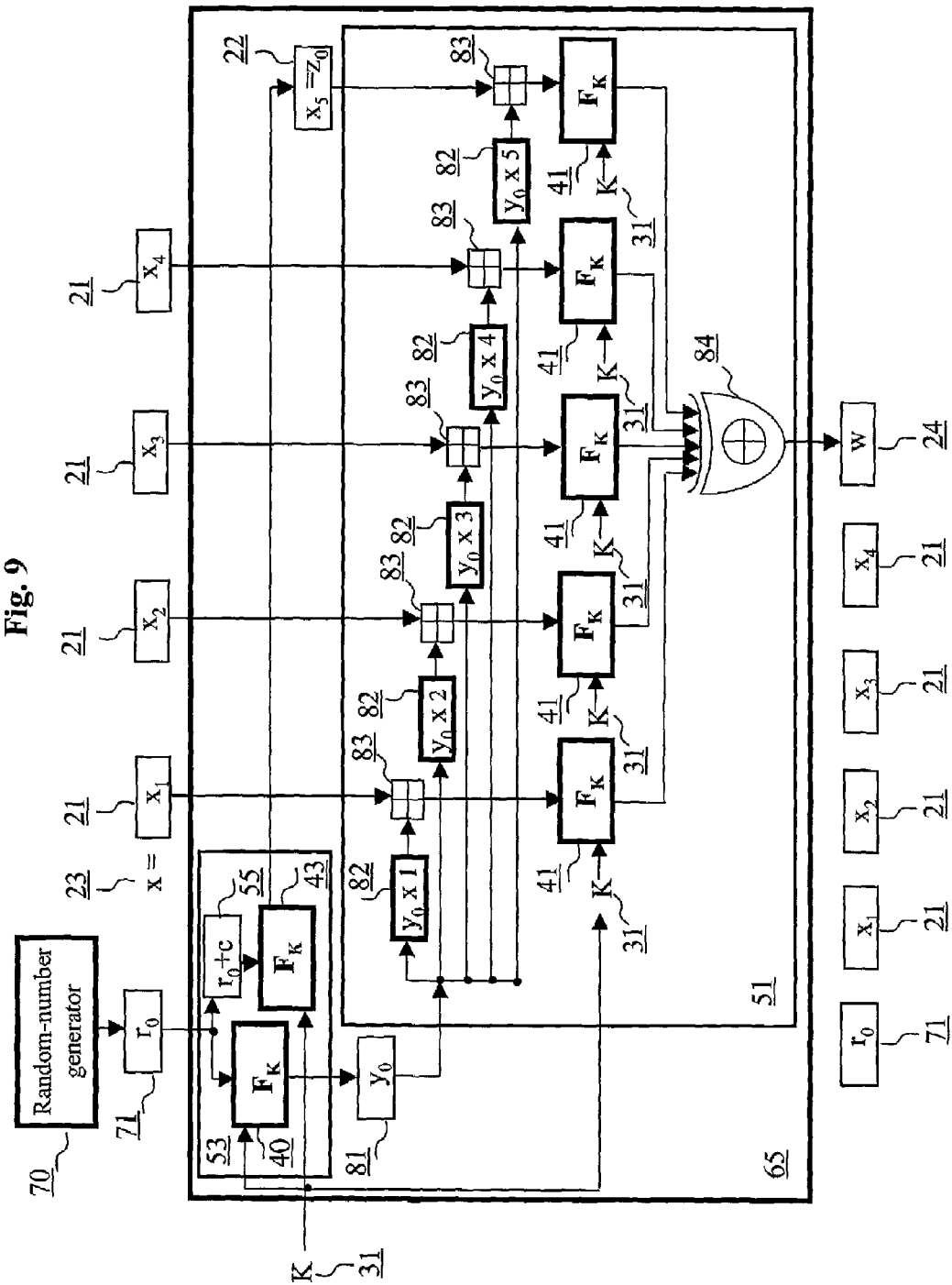
FIG. 9 illustrates a schematic diagram for an alternate embodiment of the invention of the stateless authentication scheme in which input plaintext string $x=x_1\ x_2\ x_3\ x_4$ is signed using one key K to obtain output tag w.

FIG. 9 illustrates a schematic diagram for an alternate embodiment of this invention of the stateless authentication scheme using a single secret key K 31 shared by the sender and receiver. The input string x 23 (which is padded in a standard way) containing n plaintext blocks x, 21 is signed by signing function 65 of the authentication scheme resulting in an output tag w 24. The signing function 65 uses one secret key. FIG. 9 shows an example plaintext string 23 composed of n=4 blocks, $x = x_1 x_2 x_3 x_4$.

The random number $r_0$ 71 is used in the initialization function for tag computation 53, as described in FIG. 3, together with one shared secret key K 31 to generate the random initial vector $y_0$ 81 and the random vector $z_0$ 22 of l bits in length.

The plurality of input plaintext blocks $x_1, \ldots, x_n$ 21 and the random vector $x_{n+1} = z_0$ 22, where n=4 are input to the tag computation function 51, as described in FIG. 5, that computes the tag w 24 using the random initial vector $y_0$ 81. The plaintext blocks $x_1, \ldots, x_n$ 21, the random number $r_0$ 71, and the output tag w 24 form the data transmitted through the communication channels, or stored on a storage media.

Figure 10:
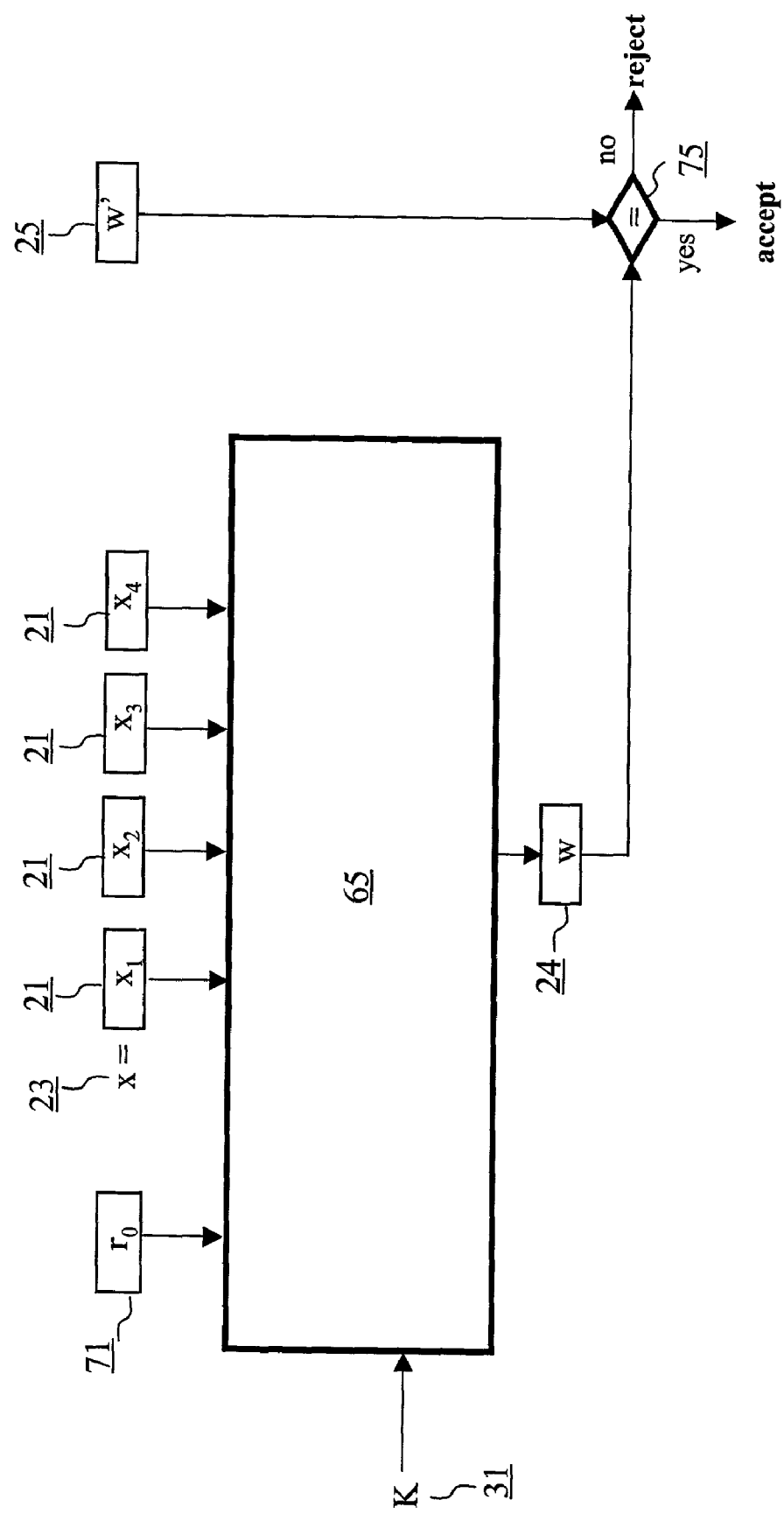
FIG. 10 illustrates a schematic diagram for an alternate embodiment of the invention of the stateless scheme for the verification of input plaintext string $x=x_1\ x_2\ x_3\ x_4$ and input authentication tag w' using one key K.

FIG. 10 represents the verification of an L-bit input authentication tag w' 25 for a plaintext string x 23 using an l-bit random number $r_0$ 71. The input plaintext string x 23 and the random number $r_0$ 71 are submitted to the signing function 65, described in FIG. 9, using a single secret key K shared by the sender and receiver resulting in the computed tag w 24 of L-bit length. The computed tag w 24 and the input authentication tag w' 25 are compared for equality at element 75. If the computed tag w 24 is equal to the input authentication tag w' 25, then the plaintext string x 23 is accepted as authentic; and, if the computed tag w 24 is not equal to the input authentication tag w' 25, then the input plaintext string x 23 is rejected. FIG. 10 shows an example plaintext string x 23 composed of n=4, l-bit blocks, $x = x_1 x_2 x_3 x_4$.

Figure 11:
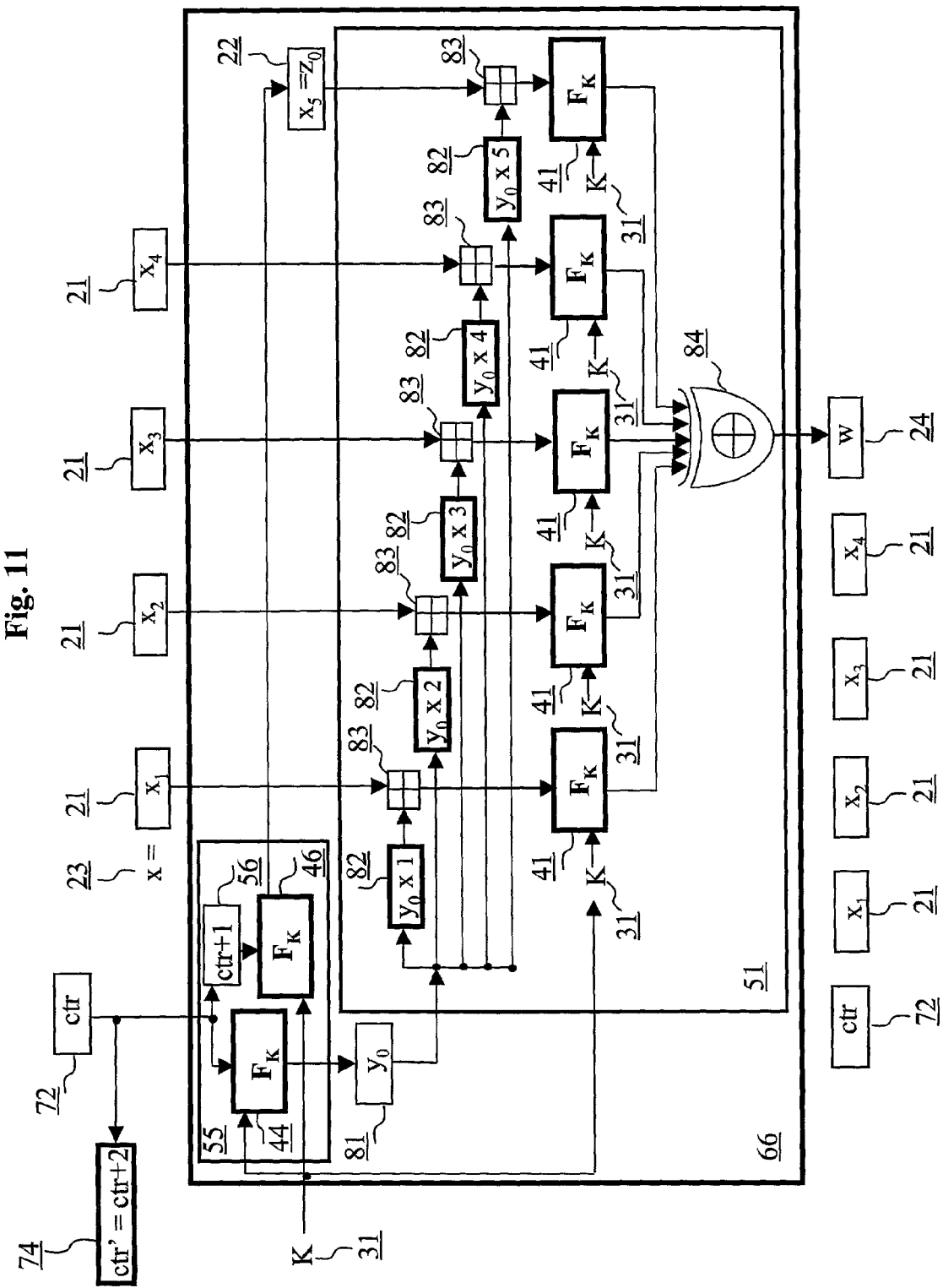
FIG. 11 illustrates a schematic diagram for an alternate embodiment of the invention of the stateful authentication scheme in which input plaintext string $x=x_1\ x_2\ x_3\ x_4$ is signed using one key K to obtain output tag w.

FIG. 11 illustrates a schematic diagram for an alternate embodiment of this invention of the stateful authentication scheme using a single secret key K 31 shared by the sender and receiver. The input string x 23 (which is padded in a standard way) containing n plaintext blocks $x_i$ 21 is signed by the signing function 66 of the authentication scheme resulting in an output tag w 24. The signing function 66 uses shared secret key K 31. FIG. 11 shows an example plaintext string 23 composed of n=4 blocks, $x = x_1 x_2 x_3 x_4$.

In this embodiment of the method of the invention a counter ctr 72 is used in the initialization function for tag computation 55 together with the shared secret key K 31 to generate the random initial vector $y_0$ 81 and the random vector $z_0$ 22 of l bits in length. The counter ctr 72 is enciphered using $F_K$ 44, the block cipher F using the shared secret key K 31, to obtain the random initial vector $y_0$ 81. A variant ctr+c 56 (where constant c is not zero) is also enciphered using $F_K$ 46, the block cipher F using the same key K 31, to obtain the random vector $x_{n+1} = z_0$ 22 of l bits in length. FIG. 11 shows an example in which the variant 56 is obtained from the addition modulo $2^l$ of the counter ctr 72 with constant one and n=4, $x_5 = z_0$. The invention, however, is not so limited, as other variants of the number 56 may also be used as input to $F_K$ 46, the block cipher F using key K 31, to obtain the random vector $x_{n+1} = z_0$ 22.

The plurality of input plaintext blocks $x_1, \ldots, x_n$ 21 and the random vector $x_{n+1} = z_0$ 22, where n=4 are input to the tag computation function 51, as described in FIG. 7, that computes the tag w 24 using the random initial vector $y_0$ 81. The plaintext blocks $x_1, \ldots, x_n$ 21, the counter ctr 72, and the output tag w 24 form the data transmitted through the communication channels, or stored on a storage media.

With the signing of each plaintext string, the current value of the counter ctr is incremented, or otherwise changed to a new value, at 74 such that this value is not equal to the variant obtained at 56. FIG. 11 shows an example in which the counter is incremented by 2. This new value of the counter is used in the signing of the next plaintext string.

Figure 12:
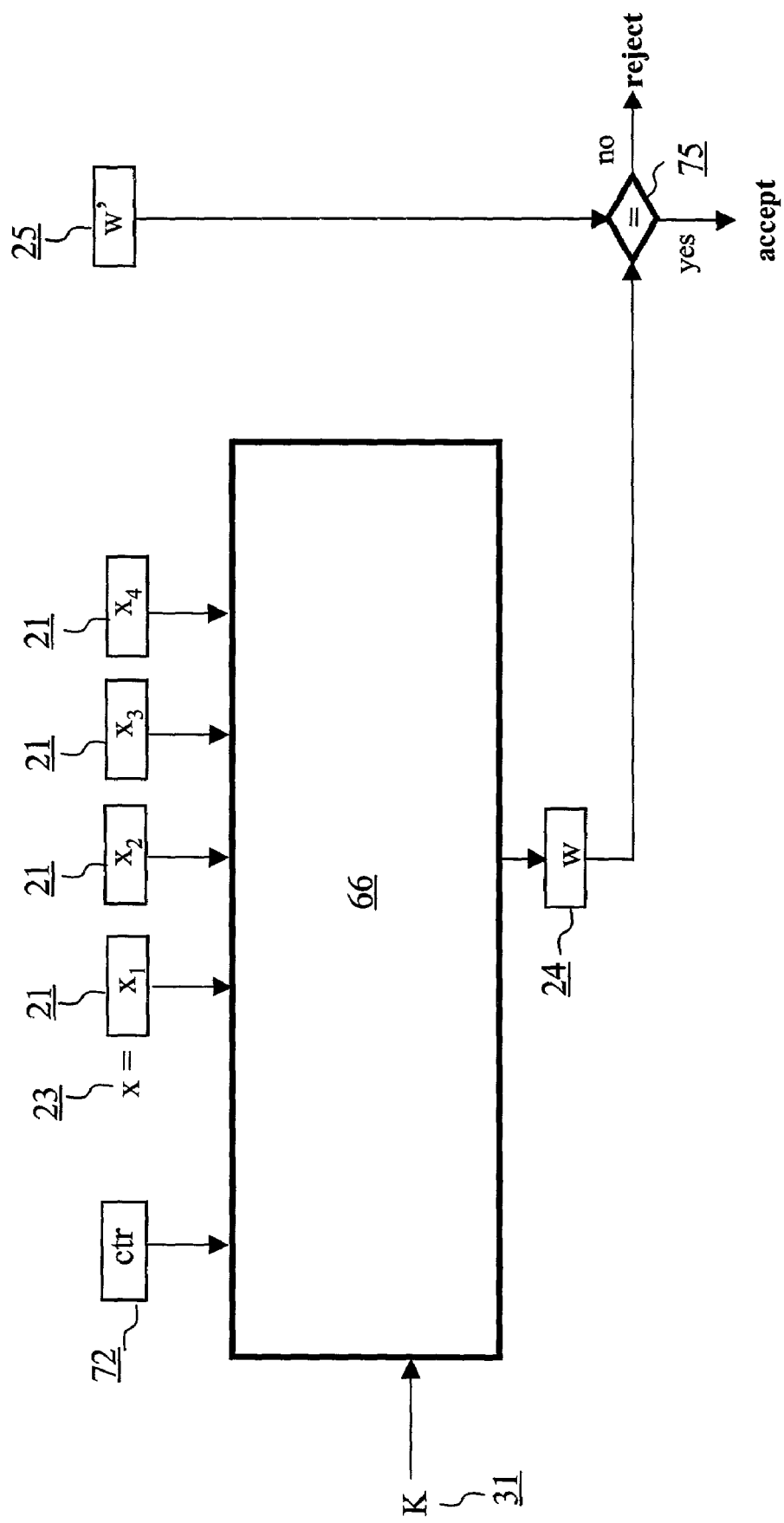
FIG. 12 illustrates a schematic diagram for an alternate embodiment of the invention of the stateful scheme for the verification of input plaintext string $x=x_1\ x_2\ x_3\ x_4$ and input authentication tag w' using one key K.

FIG. 12 represents the verification of a plaintext string x 23 and the input authentication tag w' 25 for the preferred embodiment of this invention of the stateful authentication scheme using a single secret key K shared by the sender and receiver. The input plaintext string x 23 and the counter ctr 72 are submitted to the signing function 66, as described in FIG. 11, using a shared secret key K 31 shared by the sender and receiver resulting in the computed tag w 24. The computed tag w 24 and the input authentication tag w' 25 are compared for equality at element 75. If the computed tag w 24 is equal to the input authentication tag w' 25, then the input plaintext string x 23 is accepted as authentic; and if the computed tag w 24 is not equal to the input authentication tag w' 25, then the input plaintext string x 23 is rejected. FIG. 12 shows an example plaintext string 23 composed of n=4 blocks, $x = x_1 x_2 x_3 x_4$.

Figure 13:
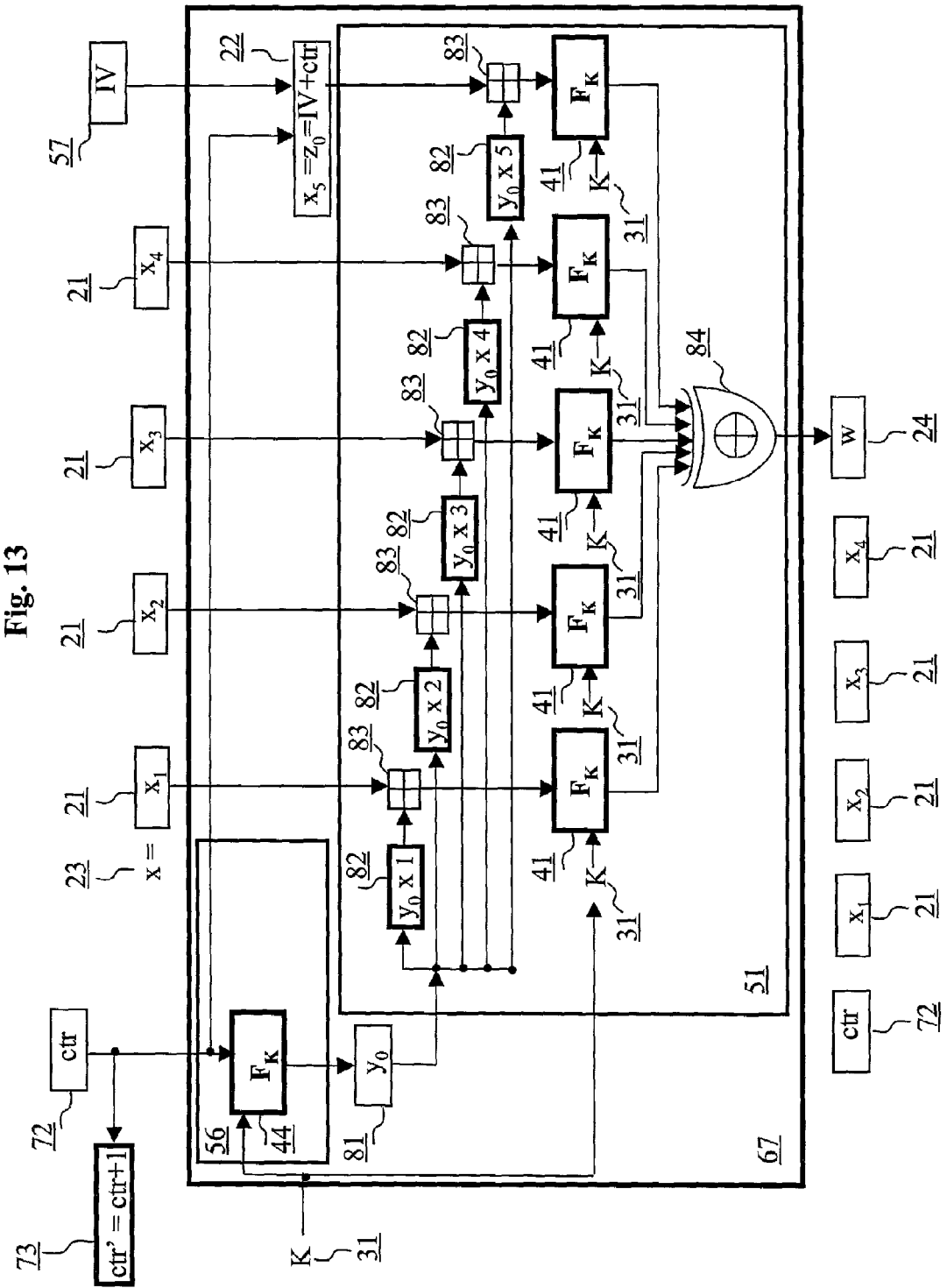
FIG. 13 illustrates a schematic diagram for an alternate embodiment of the invention of the stateful authentication scheme using a per-key random vector in which input plaintext string $x=x_1\ x_2\ x_3\ x_4$ is signed using one key K to obtain output tag w.

FIG. 13 illustrates a schematic diagram for an alternate embodiment of this invention for the stateful authentication scheme using a single secret key K 31 shared by the sender and receiver. The input string x 23 (which is padded in a standard way) containing n plaintext blocks $x_i$ 21 is signed by the signing function 67 of the authentication scheme resulting in an output tag w 24. The signing function 67 uses a single secret key K 31 shared by the sender and receiver. FIG. 13 shows an example plaintext string 23 composed of n=4 blocks, $x = x_1 x_2 x_3 x_4$.

In this alternate embodiment of the invention, a counter ctr 72 is used in the initialization function for tag computation 56 together with the shared secret key K 31 to generate the random initial vector $y_0$ 81. The counter ctr 72 is enciphered using $F_K$ 44, the block cipher F using shared secret key K 31, to obtain the random initial vector $y_0$ 81. In this embodiment of the method of the invention, random initialization vector IV 57 is secret, is generated anew for each new key K 31, is shared by the sender and the receiver, and is used for all messages signed and verified with key K 31. The random initialization vector IV 57 is generated and distributed to the sender and receiver in the same standard manner as that used for the shared secret key K 31. In an alternate embodiment the sender and the receiver generate the same value of the random initialization vector IV 57 from the already shared secret key K 31 using key separation techniques well-known in the art.

The random vector, $x_{n+1} = z_0 = IV + \text{ctr}$ 22, is used as the last block. FIG. 13 shows an example in which the variant is obtained from the addition modulo $2^l$ of the initialization vector IV 57 with the counter ctr 72 and n=4, $x_5 = z_0 = IV + \text{ctr}$. The invention, however, is not so limited, as other variants of the number 22 may also be used as the random vector $x_{n+1} = z_0$.

The plurality of input plaintext blocks $x_1, \ldots, x_n$ 21 and the random vector $x_{n+1} = z_0$ 22, where n=4 are input to the tag computation function 51, as described in FIG. 7, that computes the tag w 24 using the random initial vector $y_0$ 81. The plaintext blocks $x_1, \ldots, x_n$ 21, the counter ctr 72, and the output tag w 24 form the data transmitted through the communication channels, or stored on a storage media.

With the signing of each plaintext string, the current value of the counter ctr is incremented, or otherwise changed to a new value, at element 73. FIG. 13 shows an example in which the counter is incremented by 1. This new value of the counter is used in the signing of the next plaintext string.

Figure 14:
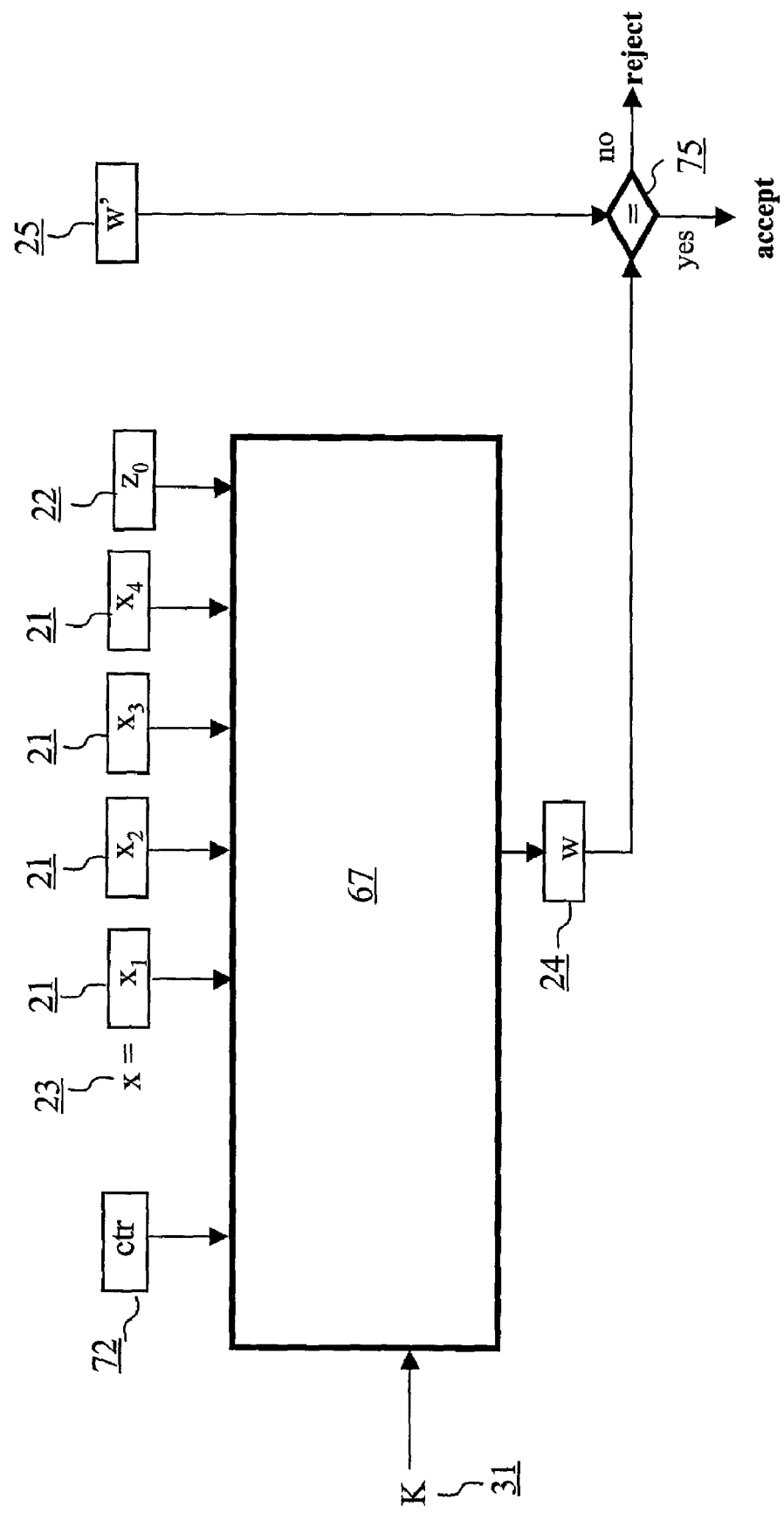
FIG. 14 illustrates a schematic diagram for an alternate embodiment of the invention of the stateful scheme using a per-key random vector for the verification of input plaintext string $x=x_1\ x_2\ x_3\ x_4$ and input authentication tag w' using one key K.

FIG. 14 represents the verification of a plaintext string x 23 and the input authentication tag w' 25 in the alternate embodiment of this invention for the stateful authentication scheme using one secret key K. The input plaintext string x 23 and the counter ctr 72 are submitted to the signing function 67 using a single secret key K 31 shared by the sender and receiver and the shared random vector $z_0$ 22 resulting in the computed tag w 24. The computed tag w 24 and the input authentication tag w' 25 are compared for equality at 75. If the computed tag w 24 is equal to the input authentication tag w' 25, then plaintext string 23 is accepted as authentic; and if the computed tag w 24 is not equal to the input authentication tag w' 25, then plaintext string x 23 is rejected. FIG. 14 shows an example plaintext string 23 composed of n=4 blocks, $x=x_1 \, x_2 \, x_3 \, x_4$.

Figure 15:
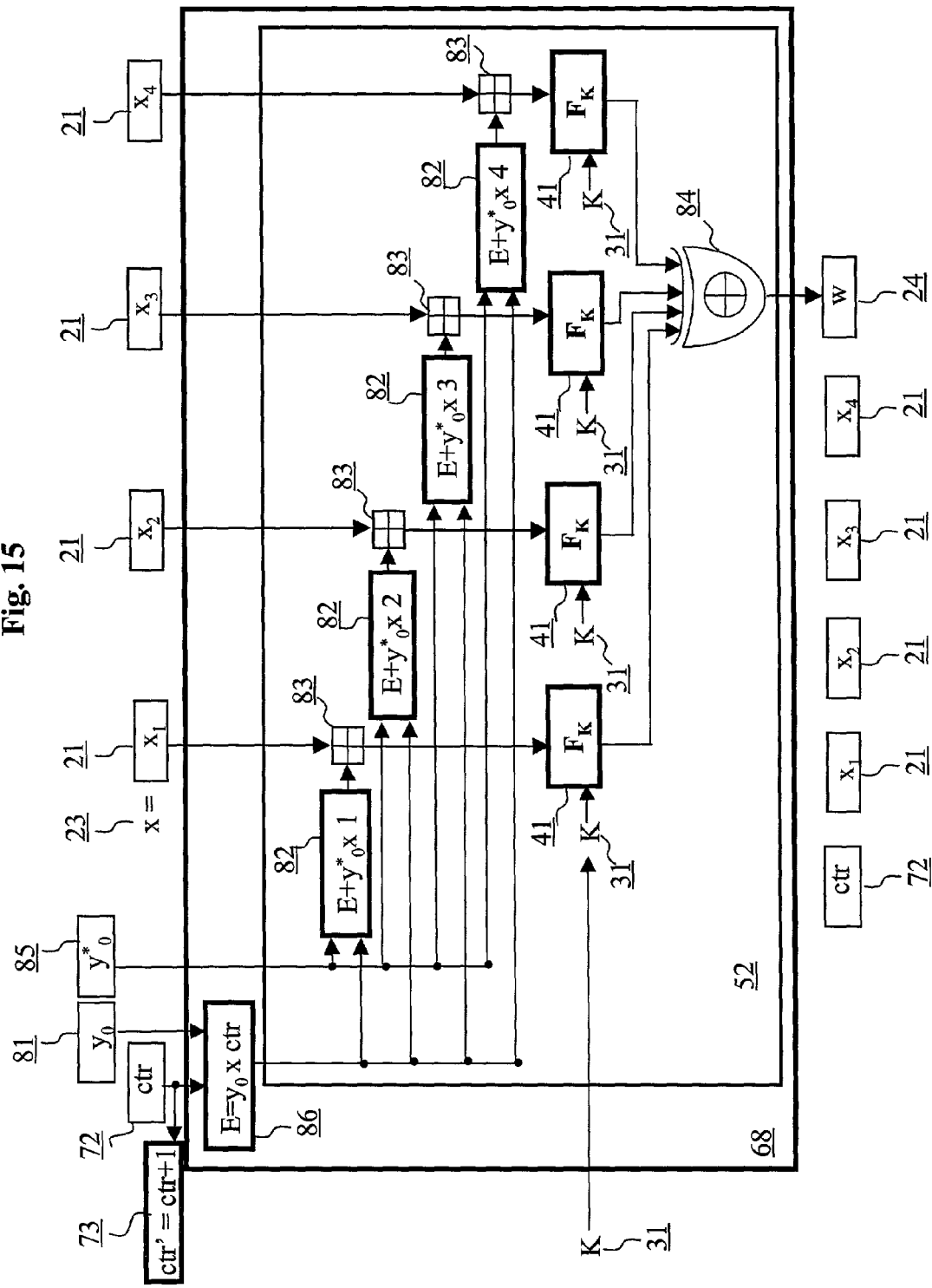
FIG. 15 illustrates a schematic diagram for yet another alternate embodiment of the invention of the stateful authentication scheme using two per-key random initial vectors in which input plaintext string $x=x_1\ x_2\ x_3\ x_4$ is signed using one key K to obtain output tag w.

FIG. 15 illustrates a schematic diagram of yet another alternate embodiment of the invention of a single-key stateful authentication scheme. The input string x 23 (which is padded in a standard way) containing n plaintext blocks $x_i$ 21 is signed by the signing function 68 of the authentication scheme resulting in an output tag w 24. The signing function 68 uses a single secret key K 31 shared by the sender and receiver. FIG. 15 shows an example of an input plaintext string 23 composed of n=4 blocks, $x=x_1 \, x_2 \, x_3 \, x_4$.

The l-bit first random initial vector $y_0$ 81 and the counter ctr 72 are used to compute the per-message unpredictable element $E=y_0 \times ctr$ 86. Element $E=y_0 \times ctr$ 86 is unpredictable because it is obtained by modular $2^l$ multiplication of $y_0$ 81, the l-bit first random initial vector, with ctr, such that for any given l-bit constant a, the probability of the event E=a is negligible, wherein the notion of negligible probability is well-known to those skilled in the art (viz., M. Naor and O. Reingold: "From Unpredictability to Indistinguishability: A Simple Construction of Pseudo-Random Functions from MACs," Advances in Cryptology—CRYPTO '98 (LNCS 1462), pp. 267–282, 1998; M. Bellare, A. Desai, E. Jokipii, and P. Rogaway: "A Concrete Security Treatment of Symmetric Authentication," Proceedings of the 38th Symposium on Foundations of Computer Science, IEEE, 1997, pp. 394–403). The fact that these elements E 86 are unpredictable means that enough of their l bits remain unknown so that the probability of the event E=a is negligible. In an alternate embodiment of this invention, the per-message unpredictable elements E are the elements of the linear congruence sequence defined by $a^i \times y_0$, where $y_0$ is the first random initial vector 81, i is the element index, i=1, . . . , n, and a is called the multiplier and is chosen to pass all the necessary spectral tests as described by D. E. Knuth in "The Art of Computer Programming—Volume 2: Seminumerical Algorithms," Addison-Wesley, 1981 (second edition), Chapter 3, incorporated herein by reference. The per-message unpredictable element $E=y_0 \times ctr$ 86 and the plurality of input plaintext blocks $x_1, \ldots, x_n$ 21, where n=4, are input to the tag computation function 52 that computes the output tag w 24 using an l-bit second random initial vector $y^*_0$ 85. In this embodiment of the method of the invention, first random initial vector $y_0$ 81 and second random initial vector $y^*_0$ 85 are secret, are generated anew for each new key K 31, are shared by the sender and the receiver, and are used for all messages signed and verified with key K 31. The first random initial vector $y_0$ 81 and the second random initial vector $y^*_0$ 85 are generated and distributed to the sender and receiver in the same standard manner as that used for the shared secret key K 31. In an alternate embodiment the sender and the receiver generate the same values of $y_0$ 81 and $y^*_0$ 85 from the already shared secret key K 31 using key separation techniques well-known in the art.

The plurality of input plaintext blocks $x_1, \ldots, x_n$ 21, where n=4, are subjected to a randomization step comprising applying a combination operation 83 to each of the first n input plaintext blocks $x_i$ 21, where i=1, . . . , n. In this embodiment, the operation 83 combines each input plaintext block $x_i$ 21, where i=1, . . . , n with each l-bit element $E+y^*_0 \times i$ 82 of a sequence of n unpredictable elements. FIG. 15 shows an example where n=4, and the combination operation 83 is applied to input plaintext blocks $x_1, x_2, x_3, x_4$. In this embodiment, the operation 83 is addition modulo $2^l$. In an alternate embodiment, the operation 83 is subtraction modulo $2^l$. In yet another embodiment, the operation 83 is the bit-wise exclusive-or operation. Each of the unpredictable elements $E+y^*_0 \times i$ 82, i=1, . . . , n, is unpredictable because it is obtained by addition modulo $2^l$ of the unpredictable element E and the result of modular $2^l$ multiplication of $y^*_0$ 85, the l-bit second random initial vector, with i, such that for any given l-bit constant a, the probability of the event $E+y^*_0 \times i=a$ is negligible, wherein the notion of negligible probability is well-known to those skilled in the art (viz., M. Naor and O. Reingold: "From Unpredictability to Indistinguishability: A Simple Construction of Pseudo-Random Functions from MACS," Advances in Cryptology—CRYPTO '98 (LNCS 1462), pp. 267–282, 1998; M. Bellare, A. Desai, E. Jokipii, and P. Rogaway: "A Concrete Security Treatment of Symmetric Authentication," Proceedings of the 38th Symposium on Foundations of Computer Science, IEEE, 1997, pp. 394–403). The fact that these elements $E+y^*_0 \times i$ 82 are unpredictable means that enough of their l bits remain unknown so that the probability of the event $E+y^*_0 \times i=a$ is negligible. In the preferred embodiment, each of the unpredictable elements 82 are computed by addition modulo $2^l$ of the per-message unpredictable element E 86 and an internal unpredictable element $y^*_0 \times i$. In an alternate embodiment, each of the unpredictable 82 are computed by subtraction modulo $2^l$ of the per-message unpredictable element E 86 and an internal unpredictable element $y^*_0 \times i$. In yet another embodiment, each of the unpredictable 82 are computed by bit-wise exclusive-or operation applied to the per-message unpredictable element E 86 and an internal unpredictable element $y^*_0 \times i$. In this embodiment of this invention, the unpredictable elements $E+y^*_0 \times i$ 82 are computed in a parallel manner. In an alternate embodiment of this invention, the unpredictable elements $E+y^*_0 \times i$ 82 are computed in a pipelined manner. In a yet another alternate embodiment of this invention, when the signing of plaintext x 23 is performed sequentially, each element of the sequence $E+y^*_0 \times (i+1)$ (where $i \geq 1$) is generated from the previous element $E+y^*_0 \times i$ by modular $2^l$ addition of the second random initial vector $y^*_0$, the first element of the sequence being E. It should be appreciated by those skilled in the art, and is a further aspect of this invention, that the per element unpredictable element E 86 and the unpredictable elements 82 can be obtained in other ways that do not depart from the spirit and scope of the present invention as set forth in the claims. In an alternate embodiment of this invention, the unpredictable elements are the elements of the linear congruence sequence defined by $E+a^i \times y^*_0$, where $y_0$ is the first random initial vector 81, i is the element index, i=1, . . . , n, and a is called the multiplier and is chosen to pass all the necessary spectral tests as described by D. E. Knuth in "The Art of Computer Programming—Volume 2: Seminumerical Algorithms," Addison-Wesley, 1981 (second edition), Chapter 3, incorporated herein by reference.

In this embodiment of this invention, the combination operation 83 is the modular $2^l$ addition. In an alternate embodiment of this invention, the combination operation 83 is modular $2^l$ subtraction operation. The invention, however, is not so limited, as other combination operations that allow the combination 83 in parallel for all plaintext input blocks may also be used for operation 83. It is also understood by those skilled in the art that any combination 83 that can be performed in parallel can also be performed in a pipelined manner and also in a sequential manner as may be appropriate for the alternate embodiments of this invention.

The randomization step applied to the plurality of input plaintext blocks $x_1, \ldots, x_n$ 21, where n=4, results in a plurality of l-bit input blocks to the block cipher. The input blocks are enciphered with the block cipher $F_K$ using key K 31 to generate a plurality of enciphered blocks. Note that in one embodiment, the input blocks enciphered have the same size as the input plaintext blocks. In this embodiment of the invention, the plurality of input blocks is generated in parallel and then it is submitted concurrently to a plurality of block ciphers $F_K$ using key K 31 to generate a plurality of enciphered blocks. In an alternate embodiment, the plurality of input blocks is submitted sequentially to a block cipher FK using key K 31 to generate a plurality of enciphered blocks.

The plurality of enciphered blocks is further combined at 84 to yield the L-bit output tag w 24 for plaintext string x 23. In the preferred embodiment of this invention, the combination operation is the bit-wise exclusive-or operation. In an alternate embodiment of the method of this invention the combination operation is the modular $2^L-1$ addition. In yet another alternate embodiment of the method of this invention, the combination operation is the modular $2^L-1$ subtraction. The invention, however, is not so limited, as other combination operations may also be used for operation 84.

The plaintext blocks $x_1, \ldots, x_n$ 21, the counter ctr 72, and the output tag w 24 form the data transmitted through the communication channels, or stored on a storage media.

With the signing of each plaintext string, the current value of the counter ctr is incremented, or otherwise changed, to a new value, at 76. FIG. 15 shows an example in which the counter is incremented by one. The incremented value of the counter is used in the signing of the input plaintext string of the next message.

Figure 16:
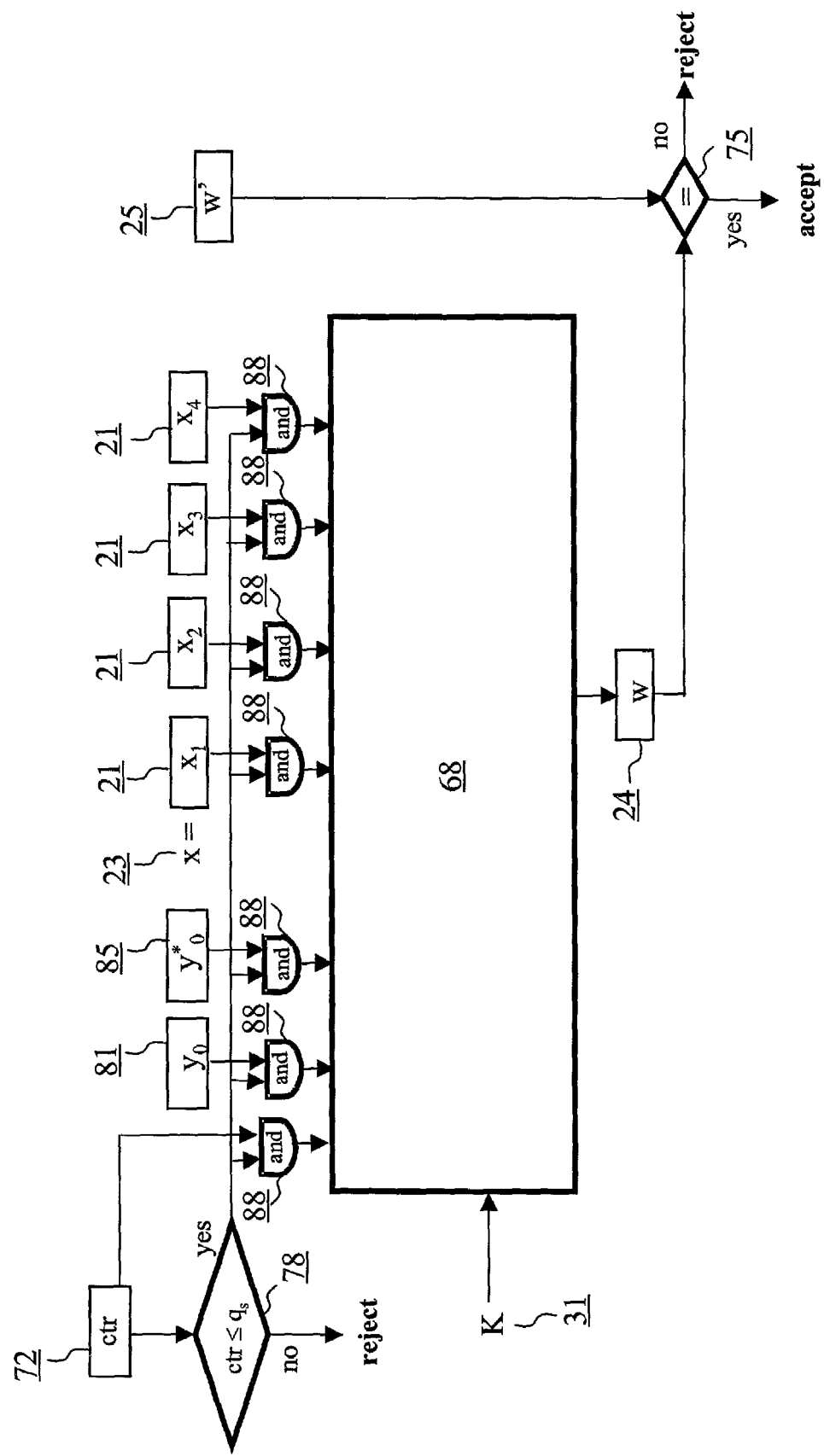
FIG. 16 illustrates a schematic diagram for yet another alternate embodiment of the invention of the stateful scheme using two per-key random initial vectors for the verification of input plaintext string $x=x_1\ x_2\ x_3\ x_4$ and input authentication tag w' using one key K.

FIG. 16 represents the verification of a plaintext string x 23 using counter ctr 72 and the input authentication tag w' 25. First the counter ctr 72 is compared at 78 with constant $q_s$ representing the maximum number of messages that can be signed. If the comparison $ctr \leq q_s$ fails, then the input plaintext string x 23 is rejected. If $ctr \leq q_s$ then the output of the logical "and" operators 88 applied to the counter ctr 72, the first random initial first random initial vector $y_0$ 81, the second random initial vector $y^*_0$ 85 and the plaintext blocks $x_1, \ldots, x_n$ 21 are submitted to the signing function 68 using a single secret key K 31 resulting in the computed tag w 24. The computed tag w 24 and the input authentication tag w' 25 are compared for equality at 75. If the computed tag w 24 is equal to the input authentication tag w' 25, then the input plaintext string x 23 is accepted as authentic; and if the computed tag w 24 is not equal to the input authentication tag w' 25, then the input plaintext string x 23 is rejected. FIG. 16 shows an example plaintext string 23 composed of n=4 blocks, $x=x_1 x_2 x_3 x_4$.

Additional properties of the embodiment of the method of this invention are now presented. In a further aspect, the method of this invention allows the incremental replacement of plaintext blocks without requiring the complete execution of the message signing procedure. That is, if an input plaintext block $x_i$ of an n-block plaintext string x (padded as necessary) is replaced with a new block $x'_i$, then the new tag w' is computed from the old tag w using only a small number of invocations of the block cipher that does not depend on the number of blocks of the input plaintext string. For instance, for the preferred embodiment of the stateless authentication scheme using two secret keys K and K' (viz., FIG. 5), if $r_0$, the random number of the original input plaintext string x, is the same as the random number for the new input plaintext string x' in which block $x_i$ of a n-block plaintext string x (padded as necessary) is replaced with a new block $x'_i$, then the authentication tag w' of plaintext string x' is thus computed as follows.

The new block $x'_i$ and the old block $x_i$ are each subjected to a randomization step comprising, in one embodiment, applying a combination operation 83 with the i-th element a sequence of n+1 unpredictable l-bit elements, where $i=1, \ldots, n+1$ to produce two l-bit input blocks. The resulting l-bit input blocks, which are of the same size as the input plaintext blocks $x'_i$ and $x_i$, are enciphered with block cipher $F_K$ 41 using the first key K 31. In the preferred embodiment of this invention, the two input blocks are generated in parallel, and then submitted concurrently to two block ciphers $F_K$ 41 using the first key K 31 to thereby generate said two enciphered blocks. In an alternate embodiment, the two input blocks are submitted sequentially to a block cipher $F_K$ 41 using the first key K 31 to generate said two enciphered blocks. The enciphered block corresponding to the old input block x, is combined using a bit-wise exclusive-or operation with the old authentication tag w, if the combination operation 84 that generates the authentication tag is the exclusive-or. In an alternate embodiment, the enciphered block corresponding to the old input block x, is combined using a modulo $2^L-1$ subtraction operation with the old authentication tag w if the combination operation 84 that generates the authentication tag is the modulo $2^L-1$ addition. In a yet another embodiment, the enciphered block corresponding to the old input block $x_i$ is combined using a modulo $2^L-1$ addition operation with the old authentication tag w if the combination operation 84 that generates the authentication tag is the modulo $2^L-1$ subtraction. The new authentication tag w' is obtained by further combining the enciphered block corresponding to the new block $x'_i$ with result of the combination of the enciphered block corresponding to the old input block $x_i$ with the old authentication tag w, said further combination operation being a bit-wise exclusive-or operation if the combination operation 84 that generates the authentication tag is the exclusive-or. In an alternate embodiment, the new authentication tag w' is obtained by further combining the enciphered block corresponding to the new block x', with result of the combination of the enciphered block corresponding to the old input block $x_i$ with the old authentication tag w, said further combination operation being a modulo $2^L-1$ addition operation if the combination operation 84 that generates the authentication tag is the modulo $2^L-1$ addition. In a yet another embodiment, the new authentication tag w' is obtained by further combining the enciphered block corresponding to the new block $x'_i$ with result of the combination of the enciphered block corresponding to the old input block $x_i$ with the old authentication tag w, said further combination operation being a modulo $2^L-1$ subtraction operation if the combination operation 84 that generates the authentication tag is the modulo $2^L-1$ subtaction. It is readily understood by those skilled in the art that the steps of the incremental block replacement operation can be readily applied to a plurality of new input plaintext blocks $x'_i$, and to other incremental operations, including deletion of a plurality of input plaintext blocks $x_i$ and insertion of a plurality of new input plaintext blocks $x'_i$.

It is readily understood by those skilled in the art that the incremental replacement, deletion, or insertion of a plurality of plaintext blocks without requiring the complete execution of the message signing procedure applies to all other embodiments of this invention, not just to the stateless authentication scheme using two secret keys K and K'.

In another aspect of this invention, the method of this invention allows out-of-order processing of tag verification. For instance, for the preferred embodiment of the stateless authentication scheme using two secret keys K and K' (viz., FIG. 6), if the random number $r_0$ is received, then the random initial vector $y_0=F_K(r_0)$ is computed with block cipher $F_K$ 41 using the first key K 31. Hence, if any plaintext block $x_i$ is accompanied by its index i and is received before the other plaintext blocks, then the corresponding unpredictable element E, $y_0 \times i$ and the output block $F_K(x_i+(y_0 \times i))$ is computed immediately with block cipher $F_K$ 41 using the first key K 31. After all of the n input plaintext blocks are received and their enciphered blocks are computed, the output block corresponding to the secret random vector is computed, namely $F_K(x_{n+1}+(y_0 \times (n+1)))$ with block cipher $F_K$ 41 using the first key K 31, and all the enciphered blocks are combined (viz., FIG. 5) to form the computed tag w. Then, the computed tag w is compared for equality with the verification tag w' (viz., FIG. 6).

It is readily understood by those skilled in the art that the out-of-order processing of tag verification applies to all other embodiments of this invention, not just to the stateless authentication scheme using two secret keys K and K' (described in FIGS. 5 and 6).

It should be appreciated by those skilled in the art that all of the specific embodiments disclosed above may be readily utilized as a basis for modifying or designing other techniques and routines for carrying out the same purposes and spirit of the present invention as set forth in the claims.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

What is claimed is:

1. An authentication method providing a data signing function that determines an authentication tag for use in conjunction with transfer of data using a communication channel or with data storage on storage media, comprising the steps of:
   partitioning said data into a plurality of data blocks;
   for each of said data blocks, performing a randomization function over said data block to create an input block of the same size as that of said data block, said input block not including a block identifier;
   applying a pseudo-random function to each said input block to create a plurality of enciphered blocks; and
   after said applying step, combining said plurality of enciphered blocks to create an authentication tag.

2. The method of claim 1, wherein the pseudo-random function is a standard block cipher.

3. The method of claim 1, wherein each of said data blocks is l bits in length.

4. The method of claim 3, comprising the step of creating a random vector block of l bits in length and then applying the pseudo-random function to the random vector block.

5. The method of claim 4, further comprising performing the randomization function over the random vector block to obtain a randomized random vector block, and then applying the pseudo-random function to the randomized random vector block.

6. The method as defined in claim 1, wherein said partitioning said data into a plurality of data blocks further comprises data padding.

7. An authentication method providing a data signing function that determines an authentication tag, comprising the steps of:
   receiving an input plaintext string comprising the data to be signed and padding it as necessary such that its length is a multiple of l bits;
   partitioning the padded input plaintext string into a plurality of equal-size plaintext blocks of l bits in length;
   creating a random vector of l bits in length;
   performing a randomization function over said plurality of plaintext blocks and the random vector block to create a plurality of input blocks each of l bits in length;
   applying a block cipher using a secret key over each of said input blocks to create a plurality of enciphered blocks each of L bits in length; and
   after said applying step, performing a combination operation over said plurality of enciphered blocks to create an authentication tag.

8. The method as defined in claim 7, comprising the steps of:
   wherein said performing a randomization function step comprises combining each of said plaintext blocks and the random vector block with a different corresponding element of a sequence of unpredictable elements to create a plurality of input blocks.

9. The method as defined in claim 8, comprising the step of generating said random vector block from a random number generated on a per-message basis.

10. The method as defined in claim 8, further comprising the steps of:
    wherein said sequence of the unpredictable elements is generated by combining a different element index i of each of the unpredictable elements and a random initial vector; and
    wherein said random initial vector is generated from said random number.

11. The method as defined in claim 9, further comprising the steps of:
    enciphering a random number using the block cipher using the secret key to generate a random initial vector;
    using this random initial vector to generate the elements of the sequence of unpredictable elements.

12. The method as defined in claim 9, wherein said random vector is generated by enciphering a variant of said random number of l bits in length, said enciphering using said block cipher using said secret key.

13. The method as defined in claim 12, wherein said variant of said random number is obtained by adding a non-zero constant to said random number.

14. The method of claim 9, further comprising the steps of:
    wherein the random number is provided by a random number generator; and
    outputting the random number as an output block of the authentication scheme.

15. The method as defined in claim 8, further comprising the step of appending the created random vector block after a last block of the set of equal-sized blocks comprising the padded plaintext string.

16. The method as defined in claim 8, wherein the input blocks from the randomization step comprise n+1 blocks each of l-bit length, where n is the total number of blocks in said set of equal-sized blocks of the padded input plaintext string.

17. The method as defined in claim 8, further comprising the step of generating each of a plurality of the unpredictable elements of said sequence of unpredictable elements by combining a different element index i of each of the unpredictable elements and a random initial vector.

18. The method as defined in claim 17, comprising the step of generating said random initial vector from a random number generated on a per-message basis.

19. The method of claim 8, wherein said random vector is generated by enciphering a random number of l bits in length, said enciphering using said block cipher using a secret second key.

20. The method as defined in claim 8, further comprising:
generating said random initial vector by enciphering a count of a counter initialized to a constant, said enciphering being performed with the block cipher using the secret key;
generating said random vector block from said count of a counter; and
incrementing said counter by one on every message signing.

21. The method as defined in claim 20, wherein said random vector block is generated by enciphering said count of a counter using a second secret key.

22. The method as defined in claim 20, wherein said random vector is generated by enciphering a variant of said count of a counter, said enciphering using said block cipher using said secret key.

23. The method as defined in claim 21, wherein said variant of said of said count of a counter is obtained by adding a non-zero constant to said count of counter.

24. The method as defined in claim 20, wherein said counter is initialized to a constant whose value is the l-bit representation of negative one.

25. The method as defined in claim 20, further comprising:
outputting said counter value as an output block of the authentication scheme.

26. The method as defined in claim 8, further comprising the steps of:
wherein the random vector is generated from a shared, per-key, random initialization vector and the count of a counter;
incrementing said counter by one on every message signing, wherein said counter is initialized to a constant whose value is the l-bit representation of negative one; and
outputting said counter value as an output block of the authentication scheme.

27. The method as defined in claim 8, wherein said combining step to create a plurality of input blocks comprises an addition modulo $2^l$ operation.

28. The method as defined in claim 8, wherein said combining step to create a plurality of input blocks comprises a bit-wise exclusive-or operation.

29. The method as defined in claim 8, wherein said combining step to create a plurality of input blocks comprises a subtraction modulo $2^l$ operation.

30. The method as defined in claim 8, further comprising:
generating a random initial vector from a random number of l-bit length; and
generating each element in said sequence of unpredictable elements by modular $2^l$ multiplication of a different unique element identifier (i) for each element in the sequence of unpredictable elements and said random initial vector.

31. The method as defined in claim 8, further comprising:
generating a random initial vector from a random number of l-bit length; and
generating each element in said sequence of unpredictable elements from the previous element by modular $2^l$ addition of said random initial vector to the previous element, with a first element of said sequence being said random initial vector itself.

32. The method as defined in claim 8,
wherein said combining to create a plurality of input blocks comprises an operation that has an inverse, and
wherein the result of the combination of any two different unpredictable elements of the sequence of unpredictable elements by said inverse operation is unpredictable; and
wherein said unpredictable elements selected as said two unpredictable elements are any two different elements of the same sequence of unpredictable elements used for the signing of said plaintext string; and
wherein said unpredictable elements selected as said two unpredictable elements are any two different elements of a plurality of sequences of unpredictable elements used for the signing of a plurality of plaintext strings with the same secret key K.

33. The method as defined in claim 8, wherein
if said combining to create a plurality of input blocks comprises an addition modulo $2^l$ operation, the result of the combination of any two different unpredictable elements of the sequence of unpredictable elements by a subtraction modulo $2^l$ operation is unpredictable;
else if said combining to create a plurality of input blocks comprises a bit-wise exclusive-or operation, the result of the combination of any two different unpredictable elements of the sequence of unpredictable elements by a bit-wise exclusive-or operation is unpredictable;
else if said combining to create a plurality of input blocks comprises a subtraction modulo $2^l$ operation, the result of the combination of any two different unpredictable elements of the sequence of unpredictable elements by an addition modulo $2^l$ operation is unpredictable; and
wherein said unpredictable elements selected as said two unpredictable elements are any two different elements of the same sequence of unpredictable elements used for the signing of said plaintext string; and
wherein said unpredictable elements selected as said two unpredictable elements are any two different elements of a plurality of sequences of unpredictable elements used for the signing of a plurality of plaintext strings with the same secret key K.

34. The method as defined in claim 7, wherein said combination operation comprises a bit-wise exclusive-or operation.

35. The method as defined in claim 7, wherein said combination operation comprises an addition modulo $2^L-1$.

36. The method as defined in claim 7, wherein said combination operation comprises a subtraction modulo $2^L-1$.

37. The method of claim 7, wherein said performing a randomization function over said plurality of plaintext blocks and the random vector block is done concurrently for each plaintext block and the random vector block.

38. The method of claim 7 wherein the plurality of input blocks resulting from performing a randomization function over said plurality of plaintext blocks and the random vector block are concurrently presented to a plurality of block ciphers using a secret key.

39. An authentication method providing a data signing function that determines an authentication tag, comprising the steps of:
receiving an input plaintext string comprising the data to be signed and padding it as necessary such that its length is a multiple of l bits;
partitioning the padded input plaintext string into a plurality of n equal-size plaintext blocks of l bits in length;
performing a randomization function over said plurality of n plaintext blocks to create a plurality of input blocks each of l bits in length;
applying a block cipher using a secret key over each of the said input blocks to create a plurality of enciphered blocks each of L bits in length; and
after said applying step, performing a combination operation over said plurality of enciphered blocks to create an authentication tag.

40. The method of claim 39, wherein said step of performing a randomization function over said plurality of n plaintext blocks comprises combining each of said plurality of plaintext blocks with a different corresponding element of a plurality of n unpredictable elements to create a plurality of input blocks.

41. The method of claim 40, wherein said combining step to create a plurality of input blocks comprises an addition modulo $2^l$ operation.

42. The method of claim 40, wherein said combining step to create a plurality of input blocks comprises a subtraction modulo $2^l$ operation.

43. The method of claim 40, wherein said combining step to create a plurality of input blocks comprises a bit-wise exclusive-or operation.

44. The method as defined in claim 40,
wherein said combining to create a plurality of input blocks comprises an operation that has an inverse, and
wherein the result of the combination of any two different unpredictable elements of the sequence of unpredictable elements by said inverse operation is unpredictable; and
wherein said unpredictable elements selected as said two unpredictable elements are any two different elements of the same sequence of unpredictable elements used for the signing of said plaintext string; and
wherein said unpredictable elements selected as said two unpredictable elements are any two different elements of a plurality of sequences of unpredictable elements used for the signing of a plurality of plaintext strings with the same secret key K.

45. The method as defined in claim 40, wherein
if said combining to create a plurality of input blocks comprises an addition modulo $2^l$ operation, the result of the combination of any two different unpredictable elements of the sequence of unpredictable elements by a subtraction modulo $2^l$ operation is unpredictable;
else if said combining to create a plurality of input blocks comprises a bit-wise exclusive-or operation, the result of the combination of any two different unpredictable elements of the sequence of unpredictable elements by a bit-wise exclusive-or operation is unpredictable;

else if said combining to create a plurality of input blocks comprises a subtraction modulo $2^l$ operation, the result of the combination of any two different unpredictable elements of the sequence of unpredictable elements by an addition modulo $2^l$ operation is unpredictable; and
wherein said unpredictable elements selected as said two unpredictable elements are any two different elements of the same sequence of unpredictable elements used for the signing of said plaintext string; and
wherein said unpredictable elements selected as said two unpredictable elements are any two different elements of a plurality of sequences of unpredictable elements used for the signing of a plurality of plaintext strings with the same secret key K.

46. The method of claim 39, wherein each of the said plurality of n unpredictable elements is obtained by applying an operation to a different per-message unpredictable element and each of a plurality of internal unpredictable elements.

47. The method of claim 46, further comprising the steps of:
wherein said per-message unpredictable element is obtained from an l-bit counter and a secret, first random initial vector shared between sender and receiver; and
wherein each of said plurality of internal unpredictable elements is obtained from an l-bit element index and a secret, second random initial vector shared between sender and receiver.

48. The method of claim 47, further comprising the steps of:
wherein said per-message unpredictable element is obtained by multiplication modulo $2^l$ of said secret, first random initial vector with a different value of the counter; and
wherein each of said plurality of internal unpredictable elements is obtained by multiplication modulo $2^l$ of said secret, second random initial vector with a different value of the index.

49. The method of claim 47, further comprising the steps of:
wherein said per-message unpredictable element is obtained from the previous per-message unpredictable element by modular $2^l$ addition of said first random initial vector to the previous per-message unpredictable element, with a first per-message unpredictable element being said first random initial vector itself; and
wherein each of said plurality of internal unpredictable elements is obtained from the previous internal unpredictable element by modular $2^l$ addition of said second random initial vector to the previous internal unpredictable element, with a first internal unpredictable element being said second random initial vector itself.

50. The method of claim 46, wherein said operation applied to a different per-message unpredictable element and each of a plurality of internal unpredictable elements comprises an addition modulo $2^l$ operation.

51. The method of claim 46, wherein said operation applied to a different per-message unpredictable element and each of a plurality of internal unpredictable elements comprises a subtraction modulo $2^l$ operation.

52. The method of claim 46, wherein said operation applied to a different per-message unpredictable element and each of a plurality of internal unpredictable elements comprises a bit-wise exclusive-or operation.

53. The method of claim 46, comprising:
generating said counter anew for every new key;
initializing generated counter to a constant value; and for each message being signed using key, incrementing said counter by one; and outputting said counter as an output block of the authentication scheme.

54. The method as defined in claim 39, wherein said combination operation comprises a bit-wise exclusive-or operation.

55. The method as defined in claim 39, wherein said combination operation comprises an addition modulo $2^L-1$.

56. The method as defined in claim 39, wherein said combination operation comprises a subtraction modulo $2^L-1$.

57. An authentication system for providing a data signing function that determines an authentication tag for use in conjunction with transfer of data using a communication channel or with data storage on storage media, comprising:

a partitioner for partitioning said data into a plurality of data blocks;

a randomization component which, for each of said data blocks, performs a randomization function over said data block to create an input block of the same size as that of said data block, said input block not including a block identifier;

a pseudo-random encipher component for applying a pseudo-random function to each said input block to create a plurality of enciphered blocks; and a combining component for combining said plurality of enciphered blocks after said pseudo-random encipher component has applied a pseudo-random function, to create an authentication tag.

58. The system of claim 57, wherein the pseudo-random encipher component applies a pseudo-random function that is a standard block cipher.

59. The system defined in claim 57, wherein the partitioner component partitioning said data into a plurality of data blocks further comprises a component for data padding.

60. An authentication system for providing a data signing function that determines an authentication tag, comprising:

a partitioner for partitioning an input plaintext string into a plurality of equal-size plaintext blocks of l bits in length;

a first component for creating a random vector of l bits in length;

a second component for performing a randomization function over said plurality of plaintext blocks and the random vector block to create a plurality of input blocks each of l bits in length;

a block cipher component for applying a block cipher using a secret key over each of said input blocks to create a plurality of enciphered blocks each of L bits in length; and a combining component for performing a combination operation over said plurality of enciphered blocks after said block cipher component has applied a block cipher, to create an authentication tag.

61. An authentication system for providing a data signing function that determines an authentication tag, comprising:

a partitioning component for partitioning a padded input plaintext string into a plurality of n equal-size plaintext blocks of l bits in length;

a first component for performing a randomization function over said plurality of n plaintext blocks to create a plurality of input blocks each of l bits in length;

a second component for applying a block cipher using a secret key over each of the said input blocks to create a plurality of enciphered blocks each of L bits in length; and a combining component for performing a combination operation over said plurality of enciphered blocks after said second component has applied a block cipher, to create an authentication tag.

62. A program product for providing a data signing function that determines an authentication tag for use in conjunction with transfer of data using a communication channel or with data storage on storage media, comprising computer readable program code, including:

first code for partitioning said data into a plurality of data blocks;

second code which, for each of said data blocks, performs a randomization function over said data block to create an input block of the same size as that of said data block, said input block not including a block identifier;

third code for applying a pseudo-random function to each said input block to create a plurality of enciphered blocks; and fourth code for combining said plurality of enciphered blocks after said third code has applied the pseudo-random function to each input block, to create an authentication tag.

63. The program product of claim 62, wherein the third code for applying the pseudo-random function applies a pseudo-random function that is a standard block cipher.

64. The program product defined in claim 62, wherein the program code for causing the performance of the step of partitioning said data into a plurality of data blocks further comprises data padding.

65. A program product for providing a data signing function that determines an authentication tag, comprising computer readable program code including:

code for partitioning an input plaintext string into a plurality of equal-size plaintext blocks of l bits in length;

code for creating a random vector of l bits in length;

code for performing a randomization function over said plurality of plaintext blocks and the random vector block to create a plurality of input blocks each of l bits in length;

code for applying a block cipher using a secret key over each of said input blocks to create a plurality of enciphered blocks each of L bits in length; and code for performing a combination operation over said plurality of enciphered blocks after said code for applying a block cipher has applied the block cipher to each input block, to create an authentication tag.

66. A program product for providing a data signing function that determines an authentication tag, comprising computer readable program code including:

first code for partitioning a padded input plaintext string into a plurality of n equal-size plaintext blocks of l bits in length;

second code for performing a randomization function over said plurality of n plaintext blocks to create a plurality of input blocks each of l bits in length;

third code for applying a block cipher using a secret key over each of the said input blocks to create a plurality of enciphered blocks each of L bits in length; and code for performing a combination operation over said plurality of enciphered blocks after said third code has applied the block cipher to each input block, to create an authentication tag.

* * * * *